United States Patent
Sharony et al.

(10) Patent No.: US 10,200,924 B2
(45) Date of Patent: *Feb. 5, 2019

(54) SMALL-CELL GATEWAY CONFIGURED FOR MULTIPLE AIR INTERFACES

(71) Applicant: Intel Corporation, Santa Clara, CA (US)

(72) Inventors: Jacob Sharony, Santa Ana, CA (US); Khurram Parviz Sheikh, San Clemente, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,805

(22) Filed: Oct. 30, 2017

(65) Prior Publication Data
US 2018/0220347 A1 Aug. 2, 2018

Related U.S. Application Data

(63) Continuation of application No. 14/722,340, filed on May 27, 2015, now Pat. No. 9,807,657, which is a
(Continued)

(51) Int. Cl.
*H04W 16/32* (2009.01)
*H04W 36/04* (2009.01)
(Continued)

(52) U.S. Cl.
CPC ........... *H04W 36/14* (2013.01); *H04W 16/32* (2013.01); *H04W 36/04* (2013.01); *H04W 36/32* (2013.01);
(Continued)

(58) Field of Classification Search
CPC ..... H04W 36/14; H04W 36/32; H04W 36/04; H04W 16/32; H04W 64/00; H04W 84/12
See application file for complete search history.

(56) References Cited

U.S. PATENT DOCUMENTS

| 6,061,565 A | 5/2000 | Innes et al. |
|---|---|---|
| 7,706,337 B2 | 4/2010 | Pandey et al. |

(Continued)

FOREIGN PATENT DOCUMENTS

| CN | 101106821 A | 1/2008 |
|---|---|---|
| CN | 101690328 A | 3/2010 |

(Continued)

OTHER PUBLICATIONS

"U.S. Appl. No. 13/603,327, Final Office Action dated Feb. 12, 2015", 25 pgs.

(Continued)

*Primary Examiner* — Brandon J Miller
(74) *Attorney, Agent, or Firm* — Schwegman Lundberg & Woessner, P.A.

(57) ABSTRACT

A communication networks including a plurality of small cell providing air interface infrastructure functionality is provided. Aspects of the present disclosure relate to the management of inter-small cell communication in accordance multiple air interfaces supported within individual small cells. Additionally, aspects of the present disclosure relate to the management of intra-small cell communication in accordance with communication networks implementing multiple small cells. In other aspects, small cells coordinate handovers through the use of a controller, or by leveraging wireless connections created between the small cells. In further aspects, the small cells enable the utilization of multiple air interface standards within a small cell.

24 Claims, 16 Drawing Sheets

Related U.S. Application Data continuation of application No. 13/603,332, filed on Sep. 4, 2012, now Pat. No. 9,088,923.

(60) Provisional application No. 61/531,311, filed on Sep. 6, 2011.

(51) Int. Cl.
  *H04W 36/14* (2009.01)
  *H04W 36/32* (2009.01)
  *H04W 64/00* (2009.01)
  *H04W 84/04* (2009.01)
  *H04W 84/12* (2009.01)

(52) U.S. Cl.
  CPC .......... *H04W 64/00* (2013.01); *H04W 84/042* (2013.01); *H04W 84/12* (2013.01)

(56) References Cited

U.S. PATENT DOCUMENTS

| | | | |
|---|---|---|---|
| 8,155,666 | B2 | 4/2012 | Alizadeh-Shabdiz |
| 8,509,213 | B2 | 8/2013 | Sivanesan et al. |
| 8,532,665 | B2 | 9/2013 | Li et al. |
| 9,014,702 | B2 | 4/2015 | Sharony et al. |
| 9,088,923 | B2 * | 7/2015 | Sharony ................ H04W 36/14 |
| 9,125,121 | B2 | 9/2015 | Sharony et al. |
| 9,143,996 | B2 * | 9/2015 | Sharony ................ H04W 36/14 |
| 9,148,835 | B2 | 9/2015 | Sharony et al. |
| 9,161,273 | B2 | 10/2015 | Sharony et al. |
| 9,807,657 | B2 * | 10/2017 | Sharony ................ H04W 36/14 |
| 9,854,489 | B2 | 12/2017 | Sharony et al. |
| 10,028,188 | B2 | 7/2018 | Sharony et al. |
| 2003/0235175 | A1 | 12/2003 | Naghian et al. |
| 2004/0095912 | A1 | 5/2004 | Gao et al. |
| 2004/0203787 | A1 | 10/2004 | Naghian |
| 2005/0053034 | A1 | 3/2005 | Chiueh |
| 2005/0271011 | A1 | 12/2005 | Alemany et al. |
| 2006/0050674 | A1 | 3/2006 | Lee et al. |
| 2007/0025296 | A1 | 2/2007 | Jung |
| 2007/0173251 | A1 | 7/2007 | Vikberg et al. |
| 2008/0108367 | A1 | 5/2008 | Afrashteh et al. |
| 2009/0062800 | A1 | 3/2009 | Shano |
| 2009/0111471 | A1 * | 4/2009 | Li ........................ H04W 36/14 455/437 |
| 2009/0262042 | A1 | 10/2009 | Li et al. |
| 2009/0285176 | A1 | 11/2009 | Zheng et al. |
| 2010/0056157 | A1 | 3/2010 | Verona et al. |
| 2010/0062770 | A1 | 3/2010 | Flynn et al. |
| 2010/0113036 | A1 * | 5/2010 | Cho .................. H04W 36/0055 455/444 |
| 2010/0177714 | A1 | 7/2010 | Hanaoka et al. |
| 2010/0203891 | A1 | 8/2010 | Nagaraja et al. |
| 2010/0240397 | A1 | 9/2010 | Buchmayer et al. |
| 2010/0255856 | A1 | 10/2010 | Kansal et al. |
| 2010/0260146 | A1 * | 10/2010 | Lu ...................... H04L 12/4633 370/331 |
| 2010/0271263 | A1 | 10/2010 | Moshfeghi |
| 2011/0044240 | A1 | 2/2011 | Jang et al. |
| 2011/0092234 | A1 * | 4/2011 | Kim ...................... H04W 48/14 455/507 |
| 2011/0103349 | A1 | 5/2011 | Choi et al. |
| 2011/0116480 | A1 | 5/2011 | Li et al. |
| 2011/0169692 | A1 | 7/2011 | MacFarlane et al. |
| 2011/0250903 | A1 | 10/2011 | Huang |
| 2011/0261753 | A1 | 10/2011 | Haddad |
| 2012/0033654 | A1 | 2/2012 | Kalbag |
| 2012/0051321 | A1 | 3/2012 | De et al. |
| 2012/0099428 | A1 | 4/2012 | Kamdar et al. |
| 2012/0201222 | A1 | 8/2012 | Muhanna et al. |
| 2012/0214483 | A1 | 8/2012 | Tong et al. |
| 2012/0230293 | A1 | 9/2012 | Grinshpun et al. |
| 2012/0264470 | A1 | 10/2012 | Bajj et al. |
| 2012/0289231 | A1 | 11/2012 | Balachandran et al. |
| 2012/0315917 | A1 | 12/2012 | Comeau et al. |
| 2013/0021929 | A1 | 1/2013 | Kim |
| 2013/0084873 | A1 | 4/2013 | Sharony et al. |
| 2013/0089069 | A1 | 4/2013 | Sharony et al. |
| 2013/0089070 | A1 | 4/2013 | Sharony et al. |
| 2013/0089071 | A1 | 4/2013 | Sharony et al. |
| 2013/0089072 | A1 | 4/2013 | Sharony et al. |
| 2013/0089077 | A1 | 4/2013 | Sharony et al. |
| 2013/0090119 | A1 | 4/2013 | Sharony et al. |
| 2013/0217385 | A1 | 8/2013 | Das et al. |
| 2013/0337831 | A1 | 12/2013 | Edge |
| 2014/0043979 | A1 | 2/2014 | Etemad et al. |
| 2014/0050086 | A1 | 2/2014 | Himayat et al. |
| 2015/0257077 | A1 | 9/2015 | Sharony et al. |
| 2015/0365861 | A1 | 12/2015 | Sharony |
| 2017/0150412 | A1 | 5/2017 | Sharony |

FOREIGN PATENT DOCUMENTS

| | | |
|---|---|---|
| CN | 104170465 A | 11/2014 |
| CN | 104170465 B | 7/2018 |
| EP | 1950992 A1 | 7/2008 |
| EP | 2752051 A1 | 7/2014 |
| JP | 2006180481 A | 7/2006 |
| JP | 2005286864 A | 4/2007 |
| JP | 2010062770 A | 3/2010 |
| JP | 2010193528 A | 9/2010 |
| JP | 2010258596 A | 11/2010 |
| JP | 4688930 B2 | 5/2011 |
| JP | 2011523245 A | 8/2011 |
| JP | 6170048 B2 | 7/2017 |
| WO | WO-2010121558 A1 | 10/2010 |
| WO | WO-2011019976 A1 | 2/2011 |
| WO | WO-2013036487 A1 | 3/2013 |

OTHER PUBLICATIONS

"U.S. Appl. No. 13/603,327, Non Final Office Action dated May 29, 2014", 26 pgs.

"U.S. Appl. No. 13/603,327, Notice of Allowance dated May 13, 2015", 13 pgs.

"U.S. Appl. No. 13/603,327, Response filed Apr. 13, 2015 to Final Office Action dated Feb. 12, 2015", 11 pgs.

"U.S. Appl. No. 13/603,327, Response filed Nov. 3, 2014 to Non Final Office Action dated May 29, 2014", 21 pgs.

"U.S. Appl. No. 13/603,330, Advisory Action dated Apr. 29, 2015", 4 pgs.

"U.S. Appl. No. 13/603,330, Examiner Interview Summary dated Sep. 2, 2015", 2 pgs.

"U.S. Appl. No. 13/603,330, Final Office Action dated Feb. 13, 2015", 20 pgs.

"U.S. Appl. No. 13/603,330, Non Final Office Action dated May 29, 2014", 21 pgs.

"U.S. Appl. No. 13/603,330, Response filed Apr. 13, 2015 to Final Office Action dated Feb. 13, 2015", 10 pgs.

"U.S. Appl. No. 13/603,330, Response filed Nov. 3, 2014 to Non Final Office Action dated May 29, 2014", 17 pgs.

"U.S. Appl. No. 13/603,332, Non Final Office Action dated Jun. 5, 2014", 27 pgs.

"U.S. Appl. No. 13/603,332, Notice of Allowance dated Feb. 18, 2015", 12 pgs.

"U.S. Appl. No. 13/603,332, Response filed Dec. 3, 2014 to Non Final Office Action dated Jun. 5, 2014", 22 pgs.

"U.S. Appl. No. 13/603,338, Non Final Office Action dated Nov. 24, 2014", 19 pgs.

"U.S. Appl. No. 13/603,338, Notice of Allowance dated Jun. 5, 2015", 11 pgs.

"U.S. Appl. No. 13/603,338, Response filed Nov. 24, 2014 to Non Final Office Action dated Nov. 24, 2014", 10 pgs.

"U.S. Appl. No. 13/603,345, Non Final Office Action dated Nov. 5, 2014", 13 pgs.

"U.S. Appl. No. 13/603,345, Notice of Allowance dated Apr. 23, 2015", 11 pgs.

"U.S. Appl. No. 13/603,345, Response filed Feb. 5, 2015 to Non Final Office Action dated Nov. 5, 2014", 11 pgs.

(56) References Cited

OTHER PUBLICATIONS

"U.S. Appl. No. 13/603,349, Examiner Interview Summary dated Feb. 10, 2015", 3 pgs.
"U.S. Appl. No. 13/603,349, Non Final Office Action dated Oct. 29, 2014", 16 pgs.
"U.S. Appl. No. 13/603,349, Notice of Allowance dated May 22, 2015", 12 pgs.
"U.S. Appl. No. 13/603,349, Respoonse filed Mar. 2, 2015 to Non Final Office Action dated Oct. 29, 2014", 12 pgs.
"U.S. Appl. No. 13/603,358, Applicant Interview Summary filed Jan. 16, 2015", 1 pgs.
"U.S. Appl. No. 13/603,358, Non Final Office Action dated Jun. 10, 2014", 24 pgs.
"U.S. Appl. No. 13/603,358, Notice of Allowance dated Dec. 17, 2014", 11 pgs.
"U.S. Appl. No. 13/603,358, Response filed Dec. 8, 2014 Non Final Office Action dated Jun. 10, 2014", 19 pgs.
"U.S. Appl. No. 14/664,227, Non Final Office Action dated Aug. 13, 2015", 12 pgs.
"U.S. Appl. No. 14/664,227, Notice of Allowance dated Dec. 14, 2015", 9 pgs.
"U.S. Appl. No. 14/664,227, Preliminary Amendment filed May 29, 2015", 10 pgs.
"U.S. Appl. No. 14/664,227, Response filed Nov. 6, 2015 to Non Final Office Action dated Aug. 13, 2015", 13 pgs.
"U.S. Appl. No. 14/722,340, Final Office Action dated Apr. 26, 2017", 21 pgs.
"U.S. Appl. No. 14/722,340, Non Final Office Action dated Nov. 16, 2016", 25 pgs.
"U.S. Appl. No. 14/722,340, Notice of Allowance dated Jun. 27, 2017", 10 pgs.
"U.S. Appl. No. 14/722,340, Preliminary Amendment filed Sep. 8, 2015", 10 pgs.
"U.S. Appl. No. 14/722,340, Response filed Feb. 16, 2017 to Non Final Office Action dated Nov. 16, 2016", 16 pgs.
"U.S. Appl. No. 14/722,340, Response filed Jun. 6, 2017 to Final Office Action dated Apr. 26, 2017", 16 pgs.
"U.S. Appl. No. 15/346,768, Preliminary Amendment filed Feb. 10, 2017", 8 pgs.
"Chinese Application Serial No. 201280054233.9, Office Action dated May 15, 2017", w/English Translation, 24 pgs.
"European Application Serial No. 12759594.0, Office Action dated Apr. 15, 2014", 2 pgs.
"European Application Serial No. 12759594.0, Response filed Oct. 27, 2014 to Office Action dated Apr. 15, 2014", 13 pgs.
"International Application Serial No. PCT/US2012/053680, International Preliminary Report on Patentability dated Mar. 20, 2014", 11 pgs.
"International Application Serial No. PCT/US2012/053680, International Search Report dated Dec. 19, 2012", 4 pgs.
"International Application Serial No. PCT/US2012/053680, Written Opinion dated Dec. 19, 2012", 9 pgs.
"Japanese Application Serial No. 2014-529802, Office Action dated Jan. 4, 2017", w/ English Translation, 5 pgs.
"Japanese Application Serial No. 2014-529802, Office Action dated May 31, 2016", (English Translation of Claims), 7 pgs.
"Japanese Application Serial No. 2014-529802, Response filed Aug. 31, 2016 to Office Action dated May 31, 2016", With English Translation of Claims, 12 pgs.
U.S. Appl. No. 13/603,332, filed Sep. 4, 2012, U.S. Pat. No. 9,088,923, Small Cells Implementing Multiple Air Interfaces.
U.S. Appl. No. 14/722,340, filed May 27, 2015, U.S. Pat. No. 9,807,657, Small Cells Gateway Configured for Multiple Air Interfaces (As Amended).
U.S. Appl. No. 13/603,358, filed Sep. 4, 2012, U.S. Pat. No. 9,014,702, Location Processing in Small Cells Implementing Multiple Air Interfaces.
U.S. Appl. No. 14/664,227, filed Mar. 20, 2015, U.S. Pat. No. 9,584,489, Location Processing in Small Cells Implementing Multiple Air Interfaces.
U.S. Appl. No. 15/346,768, filed Nov. 9, 2016, Location Processing in Small Cells Implementing Multiple Air Interfaces.
U.S. Appl. No. 13/603,327, filed Sep. 4, 2012, U.S. Pat. No. 9,143,996, Small Cells Implementing Multiple Air Interfaces.
U.S. Appl. No. 13/603,338, filed Sep. 4, 2012, U.S. Pat. No. 9,161,273, Small Cells Implementing Multiple Air Interfaces.
U.S. Appl. No. 13/603,330, filed Sep. 4, 2012, Small Cells Implementing Multiple Air Interfaces.
U.S. Appl. No. 13/603,345, filed Sep. 4, 2012, U.S. Pat. No. 9,125,121, Small Cells Implementing Multiple Air Interfaces.
U.S. Appl. No. 13/603,349, filed Sep. 4, 2012, U.S. Pat. No. 9,148,835, Small Cells Implementing Multiple Air Interfaces.
"U.S. Appl. No. 14/664,227, PTO Response to Rule 312 Communication dated Nov. 27, 2017", 2 pgs.
"U.S. Appl. No. 15/346,768, Non Final Office Action dated Jan. 10, 2018", 15 pgs.
"U.S. Appl. No. 15/346,768, Notice of Allowance dated Mar. 15, 2018", 8 pgs.
"U.S. Appl. No. 15/346,768, Response filed Feb. 20, 2018 to Non Final Office Action dated Jan. 10, 2018", 9 pgs.
"Chinese Application Serial No. 201280054233.9, Office Action dated Nov. 3, 2017", (N/English Translation), 8 pgs.
"Chinese Application Serial No. 201280054233.9, Response Filed Jan. 18, 2018 to Office Action dated Nov. 3, 2017", w/English Claims, 17 pgs.
"Chinese Application Serial No. 201280054233.9, Response Filed Sep. 30, 2017 to Office Action dated May 15, 2017", (W/ English Claims), 33 pgs.
"Japanese Application Serial No. 2017-127050, Office Action dated Mar. 27, 2018", w/ English translation, 7 pgs.
"Japanese Application Serial No. 2017-127051, Office Action dated Mar. 27, 2018", w/ English translation, 11 pgs.
U.S. Appl. No. 16/032,736, filed Jul. 11, 2018, Location Processing in Small Cells Implementing Multiple Air Interfaces.
"U.S. Appl. No. 15/346,768, Corrected Notice of Allowance dated Jun. 19, 2018", 5 pgs.
"Japanese Application Serial No. 2017-127050, Final Notification of Reasons for Rejection dated Jul. 10, 2018", w/ English Translation, 4 pgs.
"Japanese Application Serial No. 2017-127050, Response filed Jun. 27, 2018 to Office Action dated Mar. 27, 2018", W/ English Claims, 8 pgs.

\* cited by examiner

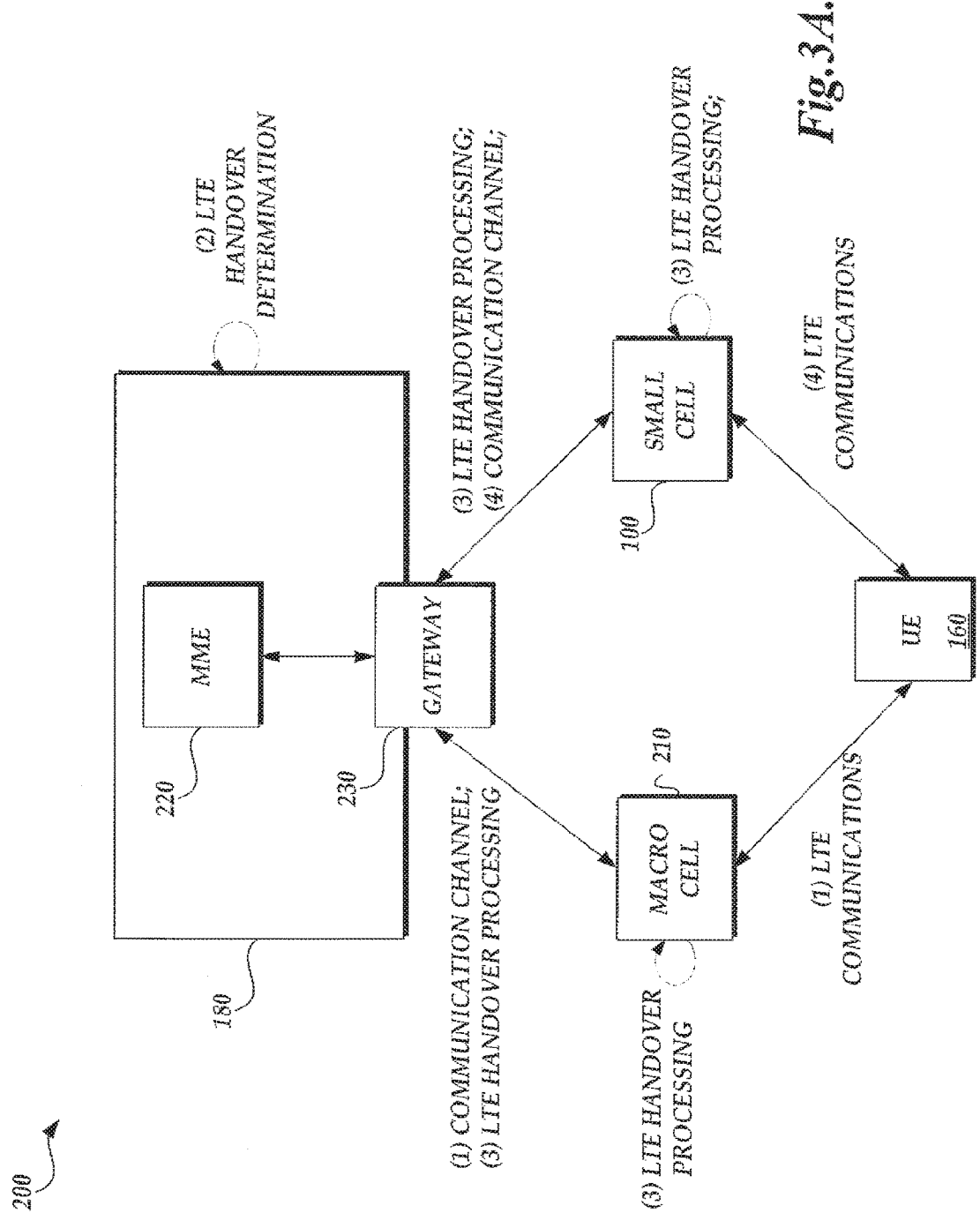

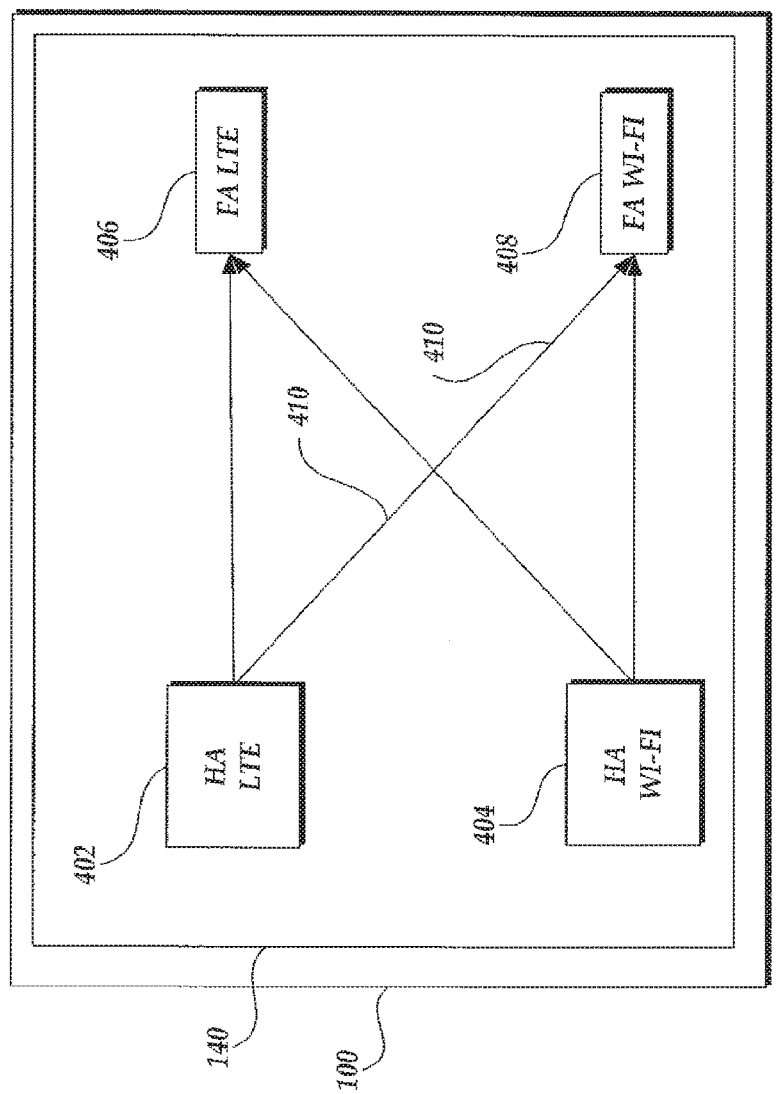

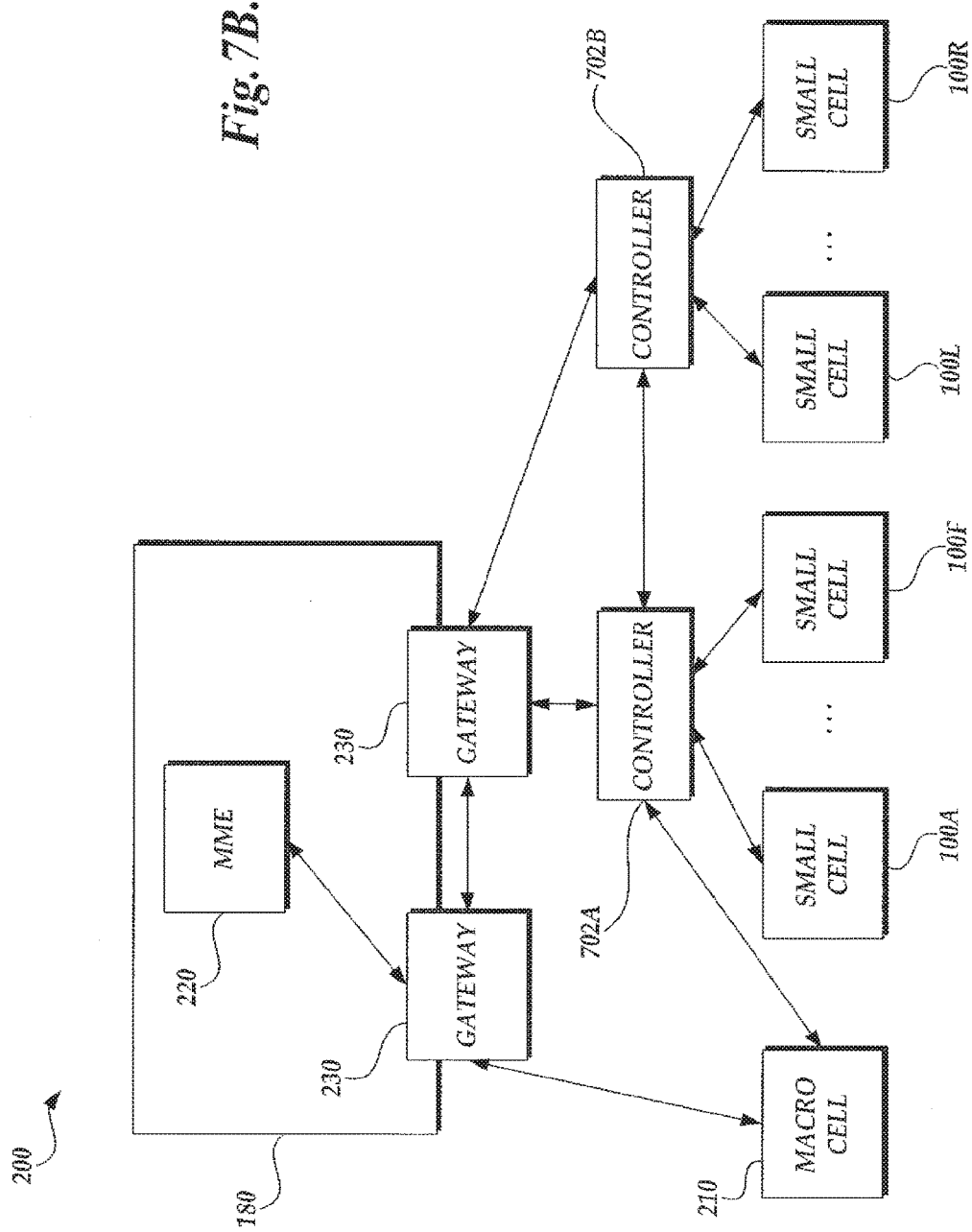

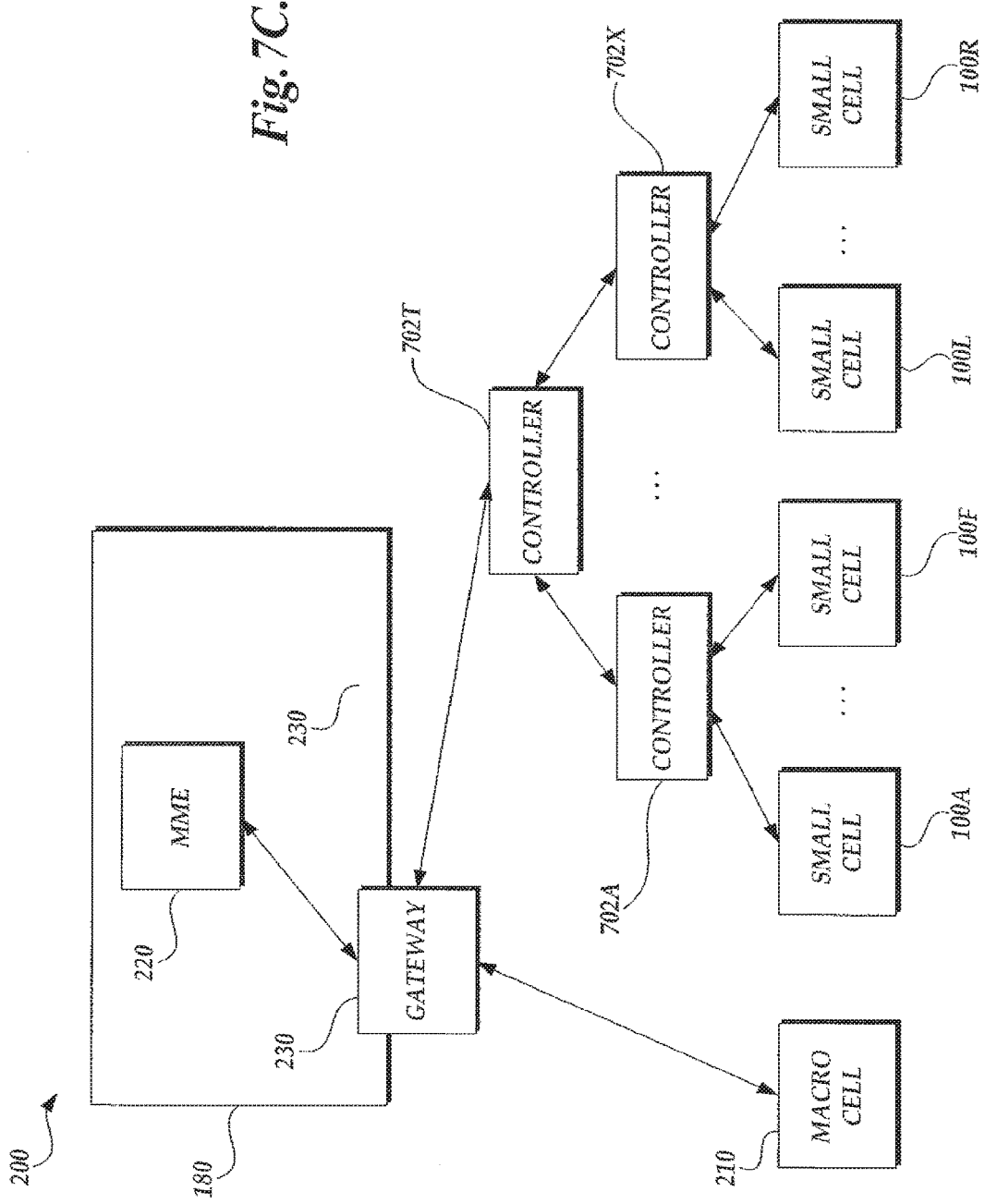

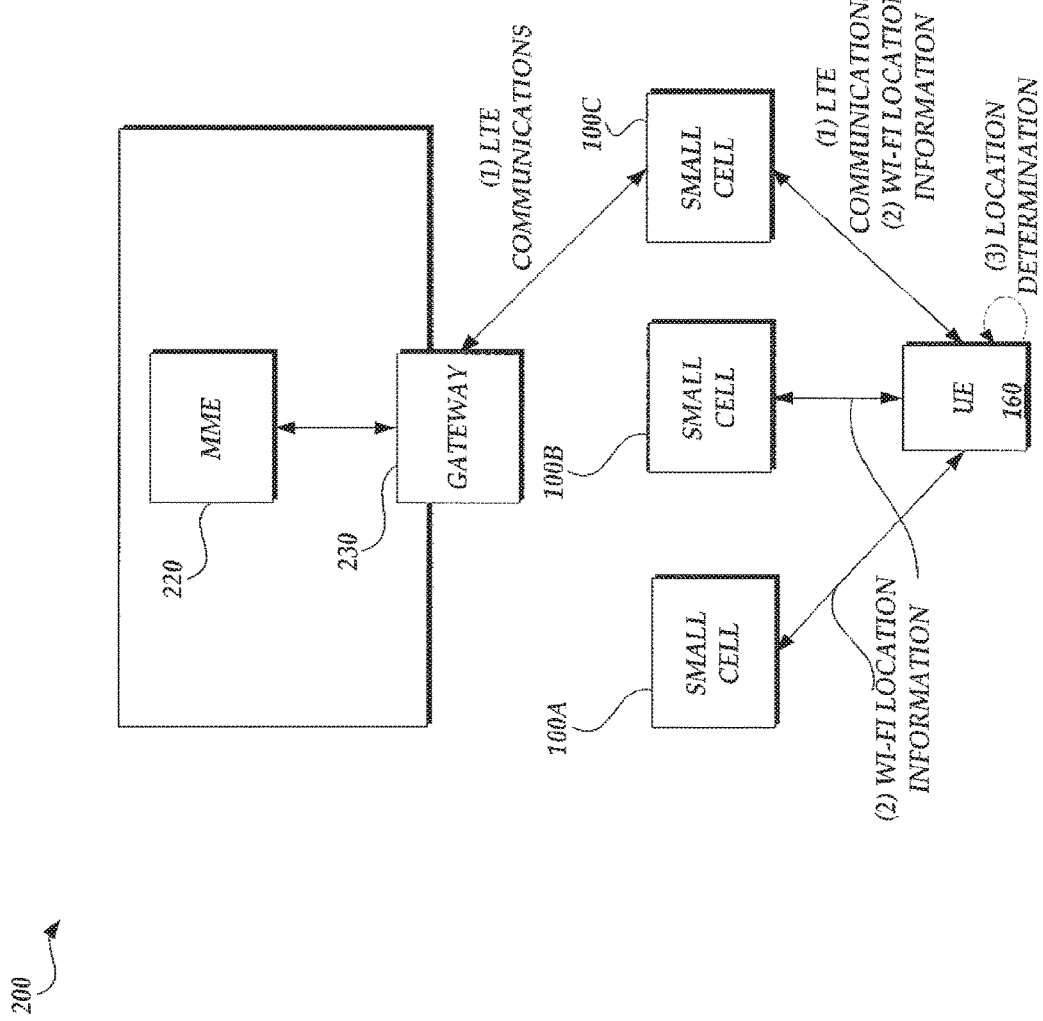

SMALL-CELL GATEWAY CONFIGURED FOR MULTIPLE AIR INTERFACES

CROSS-REFERENCE TO RELATED APPLICATION

This application claims the benefit of U.S. Provisional Patent Application No. 61/531,311 entitled UNIFIED MULTITECHNOLOGY SYSTEMS AND METHODS and filed on Sep. 6, 2011. U.S. Provisional Patent Application No. 61/531,311 is incorporated by reference herein.

BACKGROUND

Wireless networks are networks that use radio waves to carry information from one node in the network to one or more other nodes in the network. Wired communication can also be used in portions of a wireless network, such as between cells or access points. Wireless networks are used in connection with many applications, including, for example, satellite communications systems, portable digital assistants (PDAs), laptop computers, and mobile devices (including cellular telephones and user equipment). Users of such applications can connect to a network as long as the user is within range of such a wireless communication technology. The range of the wireless communication technology can vary depending on the deployment.

Cellular wireless networks are characterized by the use of base stations that provide radio coverage for a geographic area, with multiple base stations arranged to provide contiguous radio coverage over a larger area. Generally, when a mobile station is positioned within a coverage area of a base station, the mobile station can communicate in accordance with an air interface communication protocol with the base station. In turn, the base station can provide voice and data access to the mobile station via one or more circuit-switched, packet-switched signaling or transport networks.

The geographic coverage area of a base station is sometimes defined in terms of a geometric shape of a cell and base stations can often be referred to as "cells." Generally, the coverage area associated with a given cell may be logically divided geographically into a number of sectors, with each sector being defined respectively by radiation patterns from directional antenna components or antennas of the respective base station. Base stations are typically not associated with any subscriber or small group of subscribers in particular. Rather, a service provider will attempt to location base stations in publicly-accessible locations for use by the service provider's customers generally.

Traditional base stations include macro cell transceivers that are typically configured to provide wireless communications for users having properly configured mobile devices over several kilometers. The wireless communications correspond to one or more wireless communication air interface standards, such as second, third or fourth generation air interface standards. To address gaps in a macro network coverage and for other reasons such as for relief from capacity constraints, macro network service providers have recently shown interest in lighter infrastructure referred to as small cells, which may also be referred to as pico cells, small base stations, small BTSs, and by other names. Typical small cell base stations can include transceivers that provide wireless communications for the properly configured mobile devices within several hundreds of meters of a particular small cell. Illustratively, the small cells are configured to operate in accordance with the same wireless communication air interface standards. The combination of macro and small cells by a service provider can be considered a heterogeneous network, in which the service provider may attempt traffic offloading from macro base stations to small cell base stations.

In addition to supporting mobile air interface standards utilized by the macro cell transceivers, such as second, third and fourth generation air interface standards and beyond, small cells can support additional radio communication protocols. Such additional radio communication protocols, such the IEEE 802.11 communication protocol, often referred to as ("Wi-Fi"). Wi-Fi standards may be unlicensed or implemented differently from the more traditional mobile air interface standards.

BRIEF DESCRIPTION OF THE DRAWINGS

FIGS. 3A and 3B are block diagrams of the heterogeneous network of FIG. 2 illustrating embodiments of a handover between a macro cell and a small and intra-small cell handovers;

FIGS. 4A and 4B illustrate the methodology of the handover mechanism within a single small cell;

FIGS. 7A and 7B illustrate embodiments of a control mechanism for handovers between small cells;

FIG. 7C is a flow diagram illustrative of a small cell management routine implemented by a component of a heterogeneous network;

FIG. 10 illustrates an embodiment of a location service implemented with small in a heterogeneous network.

DETAILED DESCRIPTION

Generally described, the present disclosure relates to communication networks including a plurality of small cell providing air interface infrastructure functionality. Specifically, aspects of the present disclosure relate to the management of inter-small cell communication in accordance multiple air interfaces supported within individual small cells. Additionally, aspects of the present disclosure relate to the management of intra-small cell communication in accordance with communication networks implementing multiple small cells. In an illustrative embodiment, handovers between multiple radio technologies within a single small cell may utilize home-foreign agent technology used in the Mobile IP (MIP) standard. In other aspects, small cells coordinate handovers through the use of a controller, or by leveraging wireless connections created between the small cells. In further aspects, the small cells enable the utilization of multiple air interface standards within a small cell. For example, to support intra-small cell handover, a single small can support the translation of quality of service ("QoS") standards for continuous communications with network infrastructure equipment.

Although one or more aspects of the present disclosure will be described with regard to illustrative embodiment or examples, one skilled in the relevant art will appreciate that each aspect of the present disclosure can be implemented separately or that various combination of aspects may be combined. Accordingly, no particular combination of aspects of the present disclosure should be inferred.

A heterogeneous network which supports multiple communication technologies (e.g., communication in accordance with multiple air interface standards) in a unified architecture can provide near-term solutions to capacity problems. Specifically, in one embodiment, a heterogeneous network can be configured such that the heterogeneous network includes both macro-base cells and small cells and that support longer range wireless air interfaces (e.g., second, third, or fourth generation wireless air interface standards). Additionally, the small cells can also support shorter range wireless air interfaces (e.g., Wi-Fi) and further include functionality that facilitates handover between other cells (macro cells and other small cells) and handovers from communications in accordance with the longer range wireless air interface standards to communications in accordance with the shorter range wireless air interface standards, and vice versa. Such a heterogeneous network can include the coordination of security, quality of service, assessment of mobility of user equipment, authentication, provisioning systems, and the like.

Figure 1:
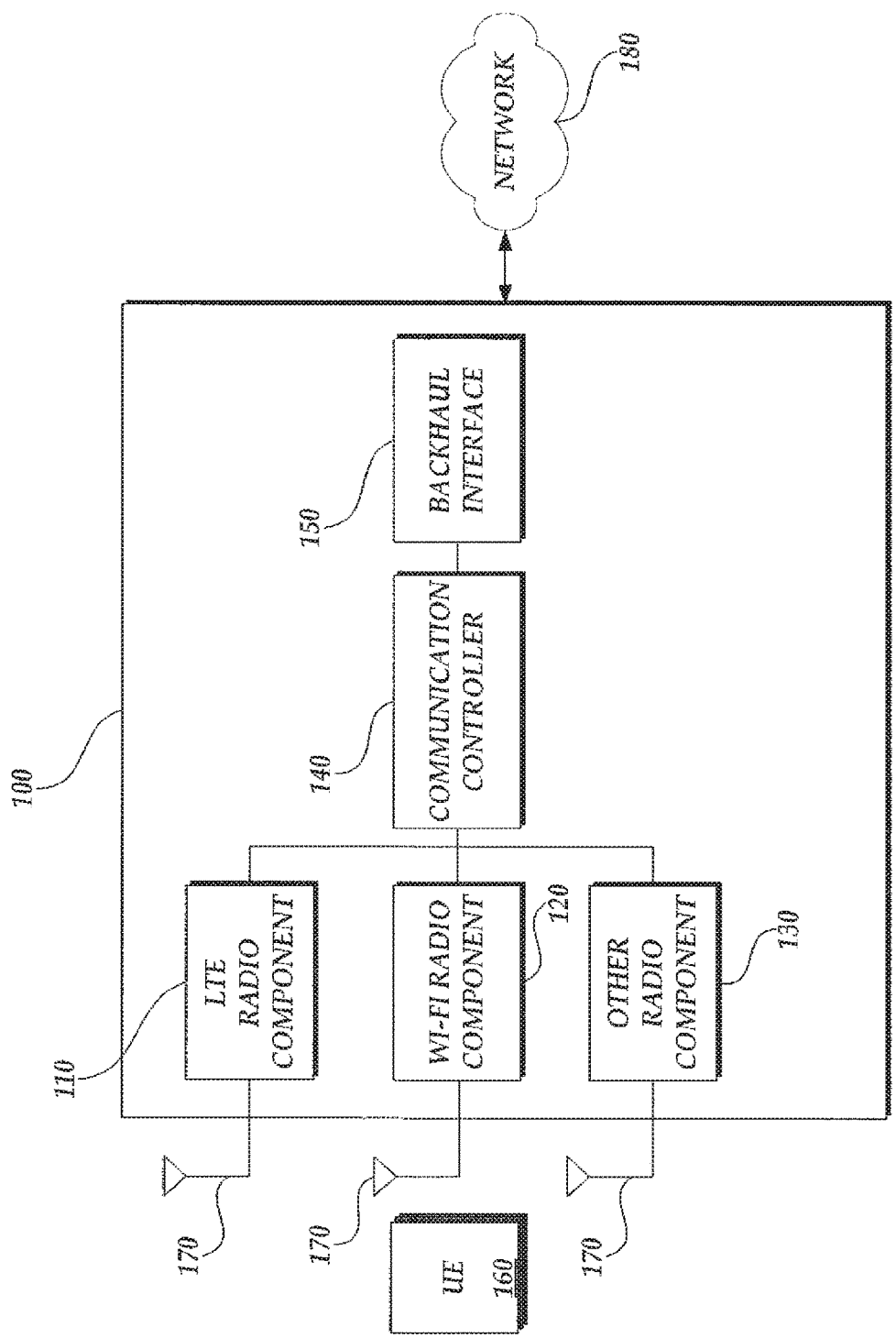
FIG. 1 is a functional block diagram of an embodiment of a small cell.

FIG. 1 is a block diagram of illustrative components of an embodiment of a small cell 100. As previously described, in one embodiment, the small cell 100 may be configured to support communications in accordance with multiple air interface standards. FIG. 1 illustrates an embodiment where two illustrative air interface standards, a longer range wireless air interface standard (e.g., the Long Term Evolution ("LTE") fourth generation air interface standard and a shorter ranger wireless air interface standard (e.g., the Wi-Fi air interface standard) are supported with the same device Additionally, the small cell 100 is configured to handover communications between the different air interface standards within the small cell, and also between small cells.

Illustratively, the small cell 100 includes an integration of a set of components that facilitate transmission of data in accordance with the supported wireless air interface standards, including, but not limited to, antennas, filters, radios, base station control components, network interface components and power supplies. One skilled in the relevant art will appreciate that all such components that could be implemented in a small cell 100 are not illustrated for purposes of brevity and not limitation. As illustrated in FIG. 1, the small cell 100 includes a first and second component for receiving signals transmitted in accordance with the supported air interface standards. In one embodiment, the first radio component can corresponds to an LTE radio 110 and the second radio component can corresponds to a Wi-Fi radio 120. The two radio components can be configured into a form factor that facilitates incorporation into the form factor desired for the small cell 100. In other embodiments, the radios may be configured to support other technologies, or more or less radios may be present in the small cell. As also illustrated in FIG. 1, the small cell 100 can also include an additional radio component 130 for receiving signals in accordance with an interface standard. The additional radio component 130 can be configured to receive signals in a manner redundant to either the first or second radio components 110, 120 or in a manner additional to the first and second radio components In various embodiments, the LTE radio component 110 may support frequencies from 700 MHz to 2600 MHz in frequency division duplex (FDD) and/or time division duplex (TDD) modes. In FDD embodiments, the LTE radio component 110 may provide a single RF carrier with support of up to 20 MHz FDD channels. Illustratively, the LTE air interface standard can be considered a longer range air interface standard based on the likely geographic range of communications between devices communicating in accordance with the LTE air interface standard. In some embodiments, the Wi-Fi radio component 120 may support several frequency bands simultaneously using multiple radios. For example, the Wi-Fi radio component 120 may support communications in the 2.4 GHz and 5 GHz frequency range. Illustratively, the Wi-Fi radio 120 may be configured to have up to 40 MHz channels. Illustratively, the Wi-Fi air interface standard can be considered a shorter range air interface standard based on the likely geographic range of communications between devices communicating in accordance with the Wi-Fi air interface standard. However, the characterization of air interfaces as longer range or shorter range does not necessarily imply the definition of any specific geographic ranges. Rather, any interface standard may be considered a longer range or shorter range air interface standard relative to another air interface standard.

As illustrated in FIG. 1, the LTE radio component 110 and the Wi-Fi radio component 120 are connected to a base station controller 140. The communication controller 140 includes common control software and provides operation and maintenance support for all technologies supported by the small cell 100. The communication controller 140 can include the same or variations similar controllers included in other infrastructure equipment, such as macro cells. The communication controller 140 is also connected to a backhaul interface 150 in the small cell 100. In various embodiments, the small cell 100 leverages a Small Form factor Pluggable (SFP) module as the backhaul interface 150. This allows flexibility to backhaul traffic with fiber, PicoEthernet or a large variety of wireless backhaul products. As indicated in FIG. 1, the small cell 100 interfaces with various user equipment (UE) 160 through antennas 170, and also with a core network 180.

The UEs 160 may correspond to any computing device having one or more telecommunication components capable of communicating with the small cell 100 in accordance with wireless air interface standards. The UE 160 can illustratively include mobile phones, personal data assistants (PDAs), smart phones, tablet PCs, personal computing devices, appliances, and the like. Additionally, the telecommunication components capable of communicating with the small cell 100 can integrated directly into the UE or provided as an add-on component or supplemental component. Still further, the telecommunications components capable of communicating with the small cell 100 may be shared by two or more UEs. For example, two or more UEs may share communication components utilizing wired connections, often referred to as tethering, or via a wireless communication protocol, often referred to as a hotspot.

In the architecture, the radio components 110, 120 in the small cell 100 communicate with the carrier's core network 180 using industry standard communication protocols. For example, the LTE radio component 110 can transmit information in accordance with the transfer control protocol ("TCP") and Internet Protocol ("IP") protocols.

Figure 2:
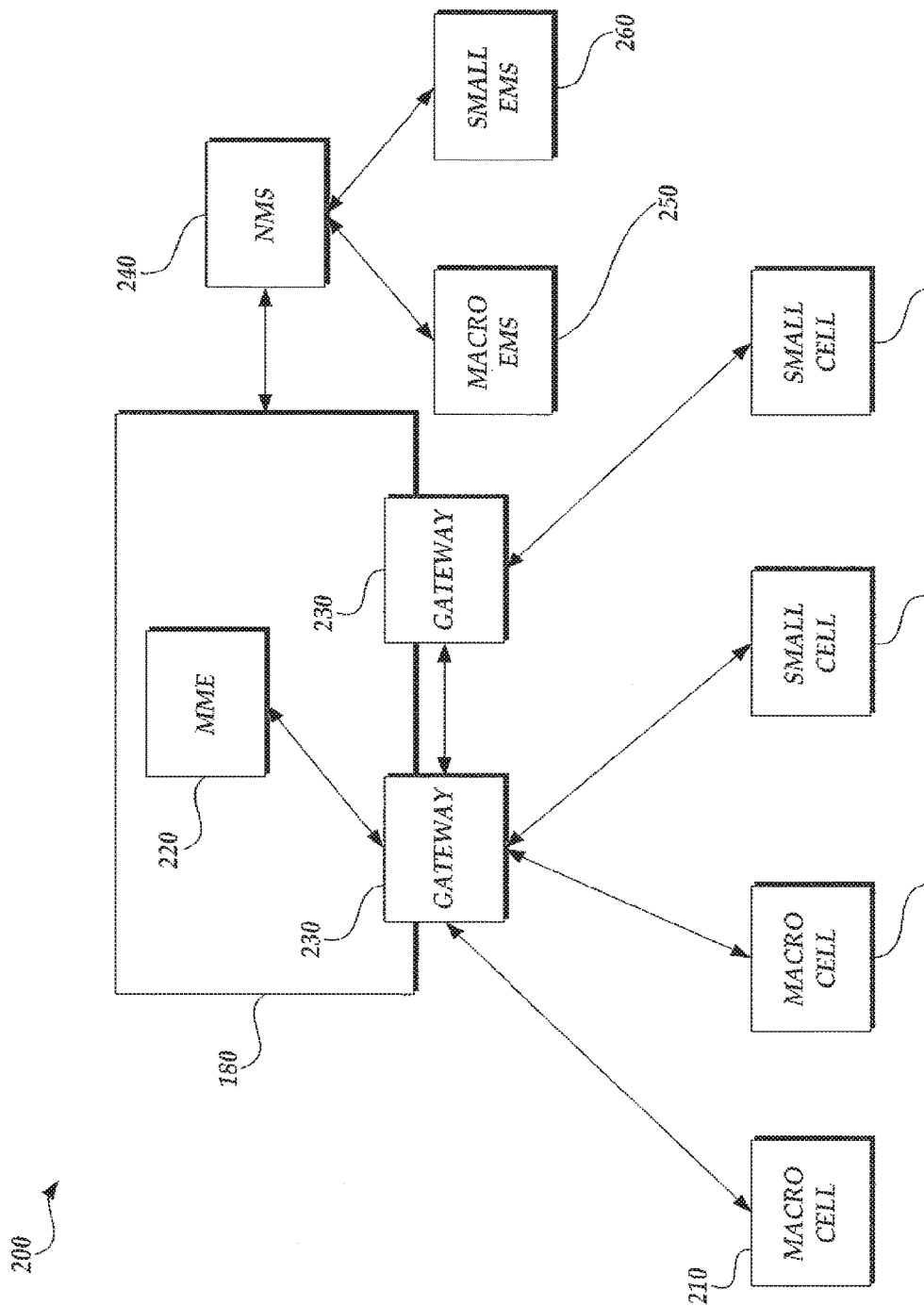
FIG. 2 is a block diagram of an embodiment of a heterogeneous network including a plurality of small cells and macro cells.

FIG. 2 is a block diagram of an embodiment of a heterogeneous network 200 including a plurality of small cells 100 (FIG. 1). As seen in FIG. 2, heterogeneous network 200 can include small cells 100 in combination with network of macro cells 210. In accordance with traditional wireless infrastructure configurations, the small cells 100 and the macro cells 210 would be in communication with one or more Mobility Management Entity (MME) 220 through one or more serving gateways 230. The communication interface between the small cells 100 and the serving gateway 230 may be over a network interface, such as a S1 interface. Alternatively, the communication between the small cells 100 and the serving gateway 230 can be achieved via a public network, such as via S1 interface utilizing a tunneling protocol. In various embodiments, a common network management system (NMS) 240 (also referred to as network management device (NMD)) may be configured to oversee and unify the respective element management systems (EMS) for the macro network (EMS 250) and the small network (EMS 260).

In general, in a heterogeneous network 200 supporting multiple air interface protocols and technologies and including macro cells 210 and small cells 100, a UE 160 may communicate with a number of macro cells 210 or small cells 100. In some instances, a UE 160 may sequentially communicate between two macro cells 210. In other instances, a UE 160 may sequentially communicate between a macro cell 210 and a small cell 100, or vice versa. In still further instances, a UE 160 may sequentially communicate between two small cells 100. Generally, a handover between, or an offload from, a first cell (e.g., a micro cell 210 or small cell 100) and a second cell in which communications between the UE and service provider correspond to the same air interface standard may be referred to as a horizontal handover or offload. In a similar manner, a handover between a first cell (e.g., a macro cell 210 or a small cell 100) in which communications between the UE 160 the service provider utilizes multiple air interface standards can be referred to as a vertical handover or offload.

Illustratively, handovers/offloads between two or more different air interface standards within a single small cell 100 may be referred to as intra-small handovers/offloads. For example, a single small cell 100 may elicit handover of a UE 160 communicating in accordance with the LTE air interface standard to communicate in accordance with the Wi-Fi air interface standard. Handovers/offloads between two or more small cells 100 with the same heterogeneous network 200 may be referred to as inter small handovers/offloads. As will be explained in greater detail below, in one aspect a small cell 100 can facilitate intra-small cell vertical handover (LTE to/from Wi-Fi). In another aspect, a small cell 100 can facilitate inter-small cell horizontal/vertical handover (LTE to LTE and LTE to/from Wi-Fi) between other small cells 100 or a macro cell 210.

These offloading capabilities of the small cell 100 help to increase the possible traffic density or the number of 'megabit per second per square mile' supported by a wireless network. In some embodiments, the traffic from the macro network can be offloaded leveraging Rel. 8 seamless LTE handover between the macro and the small cell. Traffic allocation and load balancing decisions consider: user mobility/speed, type of session, current load, user density, location, and business model.

Figure 3B:
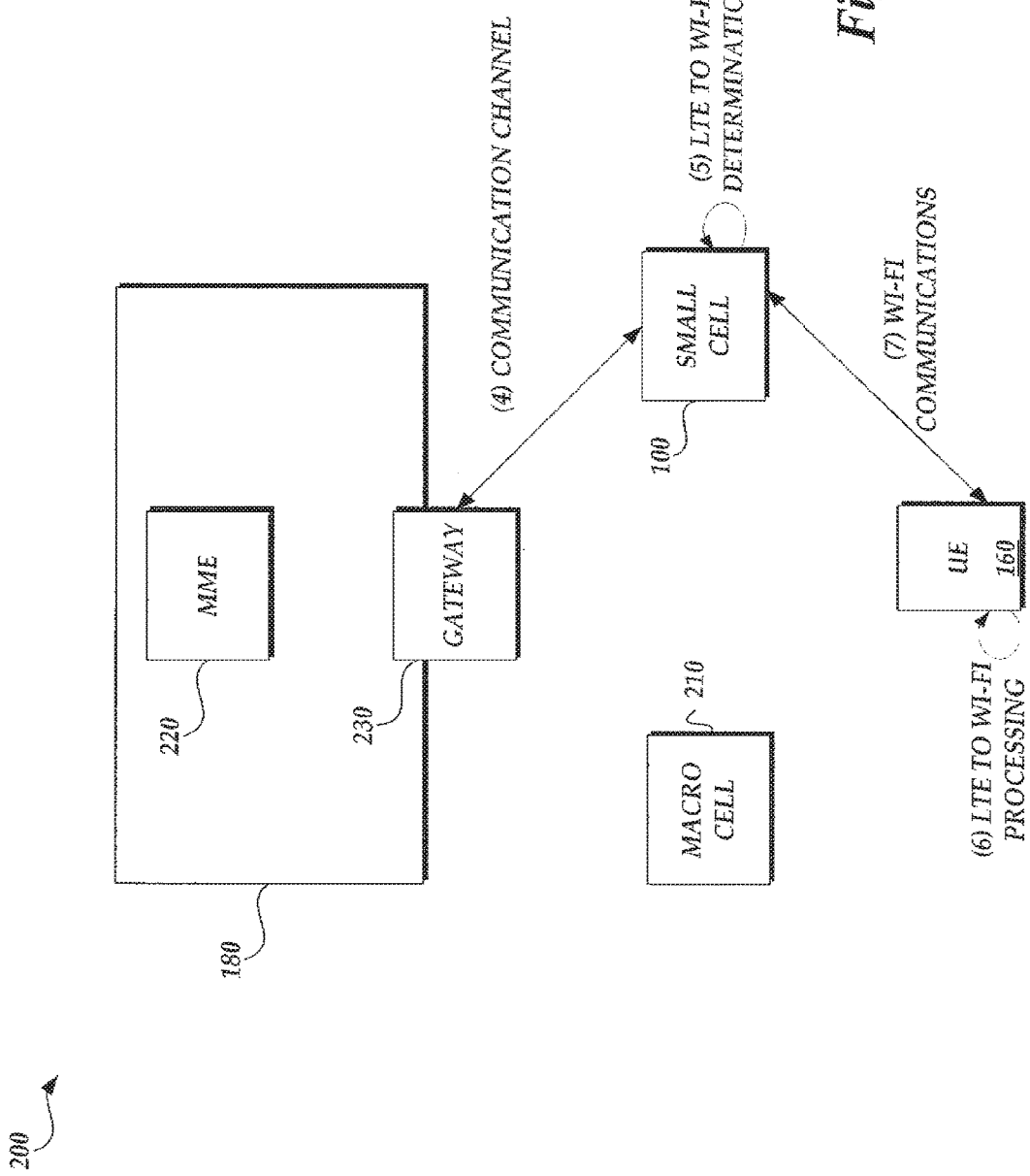

FIG. 3 is a block diagram of the heterogeneous network 200 of FIG. 2 illustrating one embodiment of the interaction of components in accordance with a handover. Specifically, FIG. 3 illustrates an indirect handover from a macro cell 210, managing communications with a UE 160 utilizing the LTE air interface standard to a small cell 100. The communications between the UE 160 and the small cell 100 will correspond to the Wi-Fi air interface standards.

As indicated by the dotted lines of FIG. 3, at (1), it is assumed that the UE 160 has established LTE-based communications with a macro cell 210. At some point, the service provider network 180 determines that the UE 160 should be handed over between the macro cell 210 and a small cell 100 at (2). The handover determination is the processed by the macro cell 210 and the small cell 100 at (3). As illustrated in FIG. 3, the communications from the UE 160 are first offloaded from the macro cell 100 to the small cell 100. The handover between the macro cell 100 and the small cell 100 is facilitated such that the small cell communicates with the UE 160 utilizing the same air interface standards, e.g., the LTE air interface standards. The UE 160 then establishes LTE-based communications with the UE 160 at (4).

With continued reference to FIG. 3, at (5), from the receiving small cell 100 conducts an intra-small handover with the UE 160 from the LTE radio component 110 to the small cell Wi-Fi radio component 120. The LTE to Wi-Fi handover is processed by the UE 160 at (6). Thereafter, communications between the UE 160 and the small cell 100 are facilitated in accordance with the Wi-Fi air interface standard at (7). The handover process between a macro cell 210 and a small cell 100 can be repeated. Additionally, a similar handover process between two small cells 100 can also be implemented in a similar manner. By way of an illustrative example, a passenger in a fast moving train may start a data session on their UE 160 connecting through any number of LTE macro cells 210 in a heterogeneous network 200. When the passenger arrives at a destination, communications with the UE 160 may be horizontally handed over to a local small cell 100 utilizing the LTE air interface standards. The passenger may then be vertically handed off within the same small cell 100 to the small cell Wi-Fi network, in an intra-small handover. In this scenario, the data session was indirectly handed-off between the macro cell 100 LTE radio component to the small cell 100 Wi-Fi radio component.

In a different scenario, different handovers may be accommodated by the small cell 100. For example, a person in a coffee shop in a mall may start downloading a large data file on their UE 160 over communications with a small cell 100 in accordance with the Wi-Fi air interface standards. At some point during the communications between the UE 160 and the small cell 100, the UE 160 (e.g., the user) may begin movement approaching the limits of the range for the small cell's Wi-Fi radio component 120. In this scenario, the data session may be handed over from the Wi-Fi radio component 120 on a small cell 100 to the LTE radio component 110 on the same small cell 100. Still further, if the person continues moving in a manner that approaches the limits of the small cell's LTE radio component 110, then there would be an inter small cell handover, horizontally (LTE radio component to LTE radio component) between two small cells. Still further, the second small cell (e.g., the receiving small cell 100) could then possibly instigate a further vertical intra small cell handover to the small cell's Wi-Fi radio component 120. In this example the data session will experience service continuity through intra and inter small cell handovers Wi-Fi-LTE-LTE-Wi-Fi. The control mechanism and the interfaces involved in the inter-small cell handover are described further below with reference to FIGS. 5 and 6.

Figure 4B:
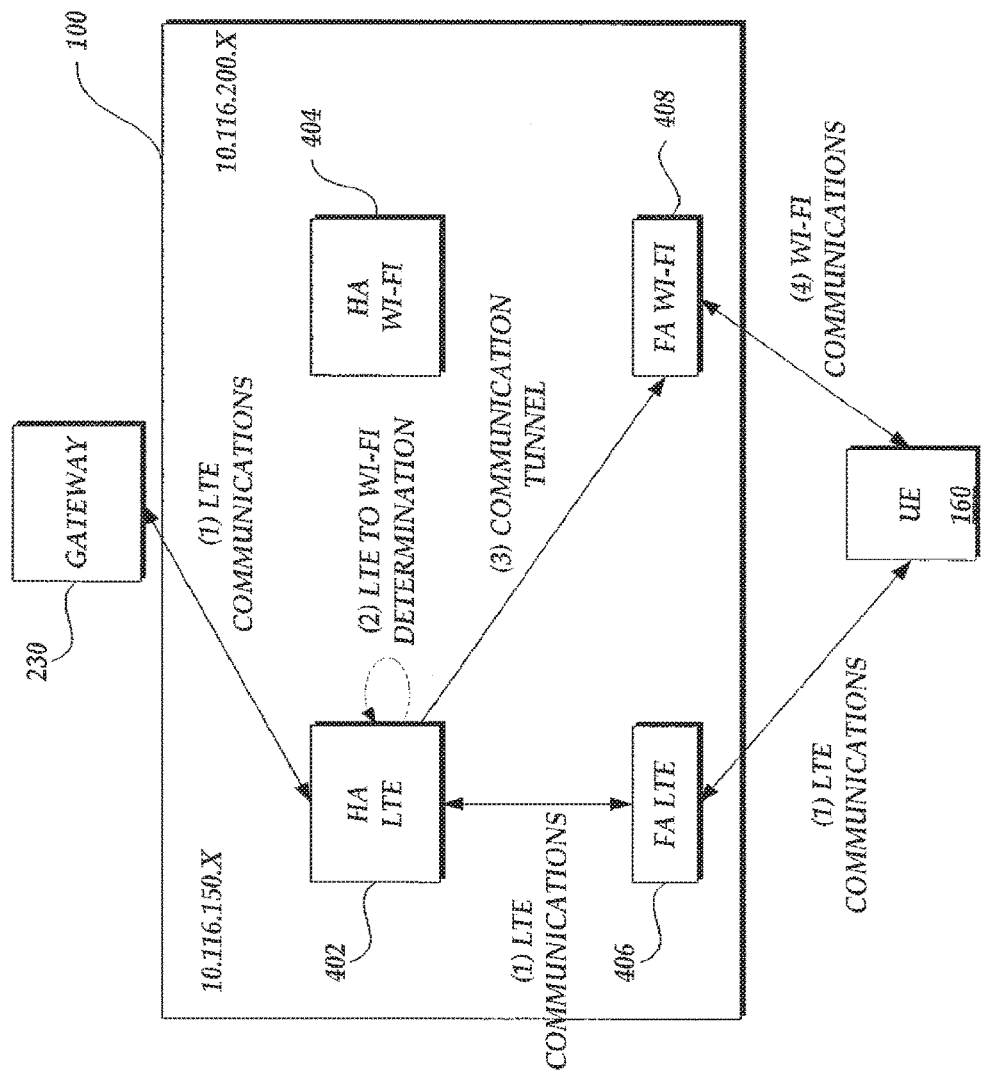

As described above, a single small cell 100 allows for handovers utilizing communications in accordance with multiple air interface standards (e.g., vertical handovers). Specifically, in an illustrative embodiment, a small cell 100 may vertically handover a UE 160 between an LTE radio component 110 and a Wi-Fi radio component 120. FIGS. 4A and 4B illustrate a methodology of the vertical handover mechanism within a single small cell 100. In one embodiment, the small cell 100 can utilize home-foreign agent technology used in the Mobile IP (MIP) protocol to facilitate that inter-small handover.

Generally, the Mobile IP protocol allows location-independent routing of IP datagrams on the Internet. Each mobile node is assigned or otherwise identified by a home network address (e.g., an IP address), which is typically associate by a home network, such as a mobile service provider. In embodiments in which a mobile node establishes communication within its home network, the mobile node communicates with the home agent of the home network. Communications from the mobile node are passed from the mobile node, through the home agent, and on to the core network. In embodiments in which the mobile node establishes communication with a network that is not a home network (e.g., a guest network), a mobile node is associated with a temporary network address (e.g., a care-of address) which identifies its current location on the guest network. Additionally, the mobile node's home address is associated with the local endpoint of a tunnel to a home agent provided by the home network. In one aspect, the Mobile IP protocol specifies how a mobile node registers with its home agent and how the home agent routes datagrams to the mobile node through the tunnel.

A node wanting to communicate with the mobile node uses the permanent home address of the mobile node as the destination address that receives packets. Because the home address logically belongs to the network associated with the home agent (e.g. the home network), normal IP routing protocols/components initially forward these packets from a sender to the home agent of the home network. Instead of forwarding packets to a destination that is physically in the same network as the home agent, the home agent redirects these packets towards the remote address through an IP tunnel by encapsulating the datagram with a new IP header using the care of address of the mobile node.

When acting as transmitter, a mobile node sends packets directly to the other communicating node, without sending the packets through the home agent, using its permanent home address as the source address for the IP packets.

With reference to FIG. 4A, in one embodiment, to facilitate inter-small handovers, a small cell 100 includes a home agent (HA) 402 for the LTE air interface standard and a HA 404 for the Wi-Fi air interface standard. In this embodiment, each home agent, HA 402 and HA 404, is associated with the same core network 180 and hosted on the same small cell 100. Illustratively, a specific home agent is utilize to facilitate communications between a UE 160 and the core network 180 based, at least in part, on which air interface standard is utilized to initiate communications between the UE 160 and the small cell 100. For example, the LTE home agent, HA 402, would utilized to establish communications between the UE 160 and the core network 180 if the UE 160 established communications with the small cell 100 in accordance with the LTE air interface standard. Similarly, the Wi-Fi home agent, HA 404, would utilized to establish communications between the UE 160 and the core network 180 if the UE 160 established communications with the small cell 100 in accordance with the Wi-Fi air interface standard. As will be explained in detail below, each home agent node may be associated with a different network address by the core network 180.

Additionally, the small cell 100 includes a foreign agent node (FA) 406 for the LTE air interface standard and a foreign agent node FA 408 for the Wi-Fi air interface standard. The foreign agent nodes function as the interface between the UE 160 and the small cell 100. The determination of which foreign agent node is a current foreign agent node will be dependent on the air interface standard utilized for communications between a UE 160 and the small cell 100.

In one aspect, each home agent node, HA 402 or HA 404, utilizes MIP tunnels, or other communication tunnels, to communicate with a respective foreign agent node, FA 404 or FA 406 (e.g., a matching foreign agent node). For example, an initial LTE-based communication between a UE 160 and a small cell 100 would utilize an MIP tunnel 410 between the LTE HA 402 and the LTE FA 406. Similarly, an initial Wi-Fi-based communication between the UE 160 and a small cell 100 would utilize an MIP tunnel 410 between the Wi-Fi HA 404 and the Wi-Fi FA 408. Each HA 402 or HA 404 may be addressable by different network addresses assigned or accepted by the core network 180.

In another aspect, each home agent, HA 402 or HA 404, utilizes MIP tunnels, or other communication tunnels, to communicate with an opposite foreign agent node, FA 408 or FA 406, respectively (e.g., an opposite foreign agent node). Illustratively, a home agent node will not change once communications between a UE 160 and the core network 180 are initiated. To facilitate an air interface handover, the home agent node will utilize communication tunnels to a different foreign agent node. For example, for a communication initiated in accordance with the LTE air interface standard but that has been handover to the Wi-Fi air interface standard would utilize an MIP tunnel 410 between the LTE HA 402 and the Wi-Fi foreign agent 408. Similarly, for a communication initiated in accordance with the Wi-Fi air interface standard but that has been handover to the LTE air interface standard would utilize an MIP tunnel 410 between the Wi-Fi HA 404 and the LTE foreign agent 406. In some embodiments, however, the UE 160 would remain addressable by the network address associated with the original home agent node. Using the MIP tunnel 410 between the home and foreign agents allows the small cell 100 to make the handovers between LTE and Wi-Fi air interface standards without breaking a communication channel. Data communications can be offloaded from the LTE to Wi-Fi air interface standards (or vice versa) by switching between the respective MIP tunnels 410. The various pass through and switch combinations between the HAs 402, 404 for LTE and Wi-Fi and the Fas 406, 408 for LTE and Wi-Fi provide what is referred to as 2×2 support. Accordingly, the handover between the air interface standards within a small cell 100s may be considered to be independent of communications with the core network 180. In some embodiments, the core network 180 may not have any knowledge of a current air interface standard being utilized between a UE 160 and a small cell 100 or when an intra small cell handover has occurred.

To illustrate the HA-FA architecture in more detail, an example intra small LTE-to-Wi-Fi handover will now be described with reference to FIG. 4B. For illustrative purposes, assume that a UE 160 has initialized an LTE-based communication channel with the small cell 100. As previously indicated, the LTE data may flow from the UE 160 to the core network would be associated with a network address associated with the HA 402, e.g., IP 10.116.150.5.

Accordingly, data received at the LTE HA 402 would be passed through to the LTE FA 406 via the MIP tunnel 410, and made available to a UE 160 on IP 10.116.150.5, as received.

At some point, assume for an illustrative example, that the small cell 100 determines that handover to the Wi-Fi air interface standard should occur between the UE 160 and the small cell 100. In this example, the LTE HA 402 would use a MIP Tunnel 410 to switch the data flow over to the Wi-Fi FA 408 (which has a proxy MIP inside). As illustrated in FIG. 4B, the small cell provides data on a Wi-Fi interface of a UE 160 with IP 10.116.200.6 corresponding to the foreign agent node FA 408. However, because of the utilization of the MIP tunnel 410, the UE 160 continues to receive data flow associated with the original IP address of the LTE home agent HA 402. Further details of the handover process within a small cell 100 in the two directions (LTE-Wi-Fi and Wi-Fi-LTE) are provided below, with reference to FIGS. 5 and 6. Additionally, the home agent node, HA 402, can continue to utilize the MIP tunnels 410 to effectuate multiple handovers.

Figure 5:
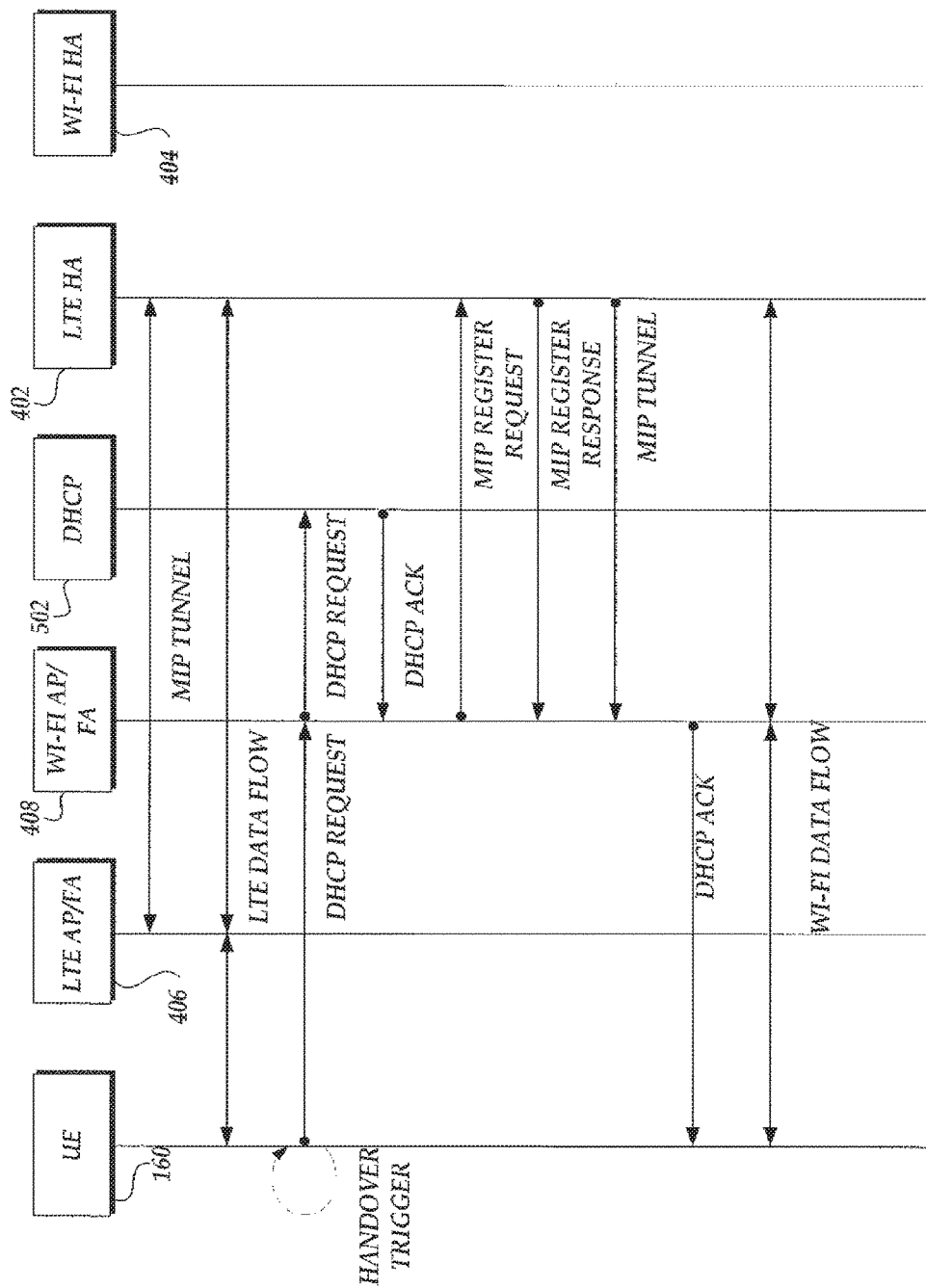
FIG. 5 illustrates the handover process within a small cell from LTE to Wi-Fi air interface standards.

FIG. 5 illustrates the handover process within a small cell from LTE to Wi-Fi air interface standards. As illustrated in FIG. 5, initial traffic may be on the LTE interface between the UE 160 and the LTE Access Point (AP)/FA 406. Since there is a MIP Tunnel 410 formed between the HA 402 and the LTE Access Point (AP)/FA 406, there is data flow in accordance with the LTE air interface standards from the LTE HA 402 to the LTE Access Point (AP) 406, and to the UE 160. If the UE 160 triggers a handover, the handover process is initiated. A handover may be triggered for a variety of reasons. For example, there may be a problem with the LTE signal, there may be a new Wi-Fi network discovered, the user may have just subscribed to a Wi-Fi network, the user may become less mobile, there may be too many users on the access point, and the like.

With continued reference to FIG. 5, once the handover is triggered, there is a DHCP request sent from the UE 160 to the Wi-Fi FA 408. The Wi-Fi FA 408 then contacts the DHCP server 502, which may be within the small cell or somewhere on the core network, to obtain a DHCP address. The DHCP server 502 acknowledges the Wi-Fi FA 408 request. Then the Wi-Fi FA 408 sends a MIP Register Request to the LTE HA 402, and the LTE HA 402 responds to the Wi-Fi FA 408, and creates a MIP Tunnel 410 between the LTE HA 402 and the Wi-Fi FA 408. Then the Wi-Fi FA 408 acknowledges the UE's DHCP request, and there is data flow created between the LTE HA 402 and the UE 160 via the Wi-Fi FA 408.

Figure 6:
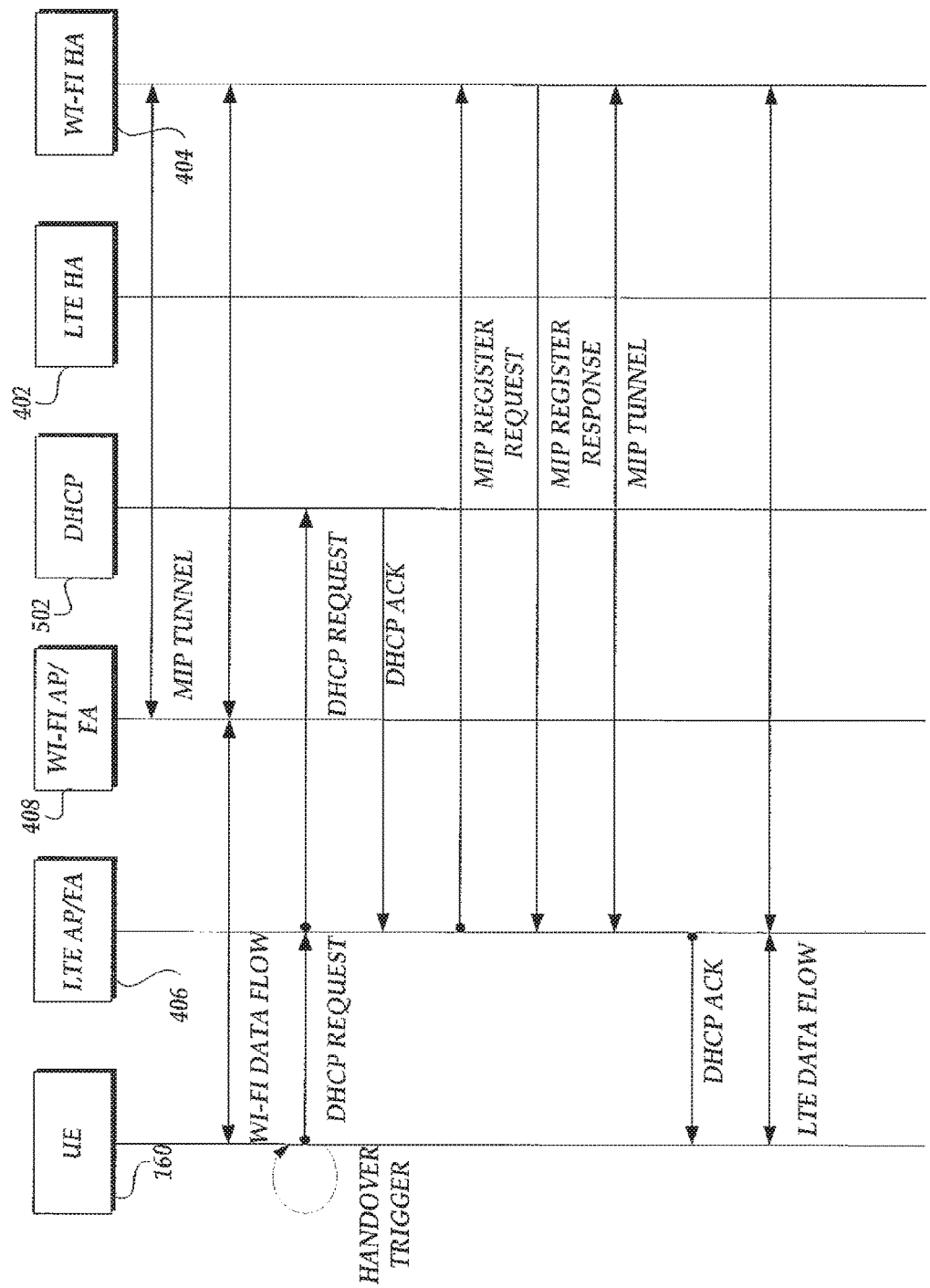
FIG. 6 illustrates the handover process within a small cell from Wi-Fi to LTE air interface standards.

FIG. 6 illustrates the handover process within a small cell 100 from Wi-Fi to LTE air interface standards. As illustrated in FIG. 6, initial traffic may be on the Wi-Fi interface between the UE 160 and the Wi-Fi Access Point (AP)/FA 408. Since there is a MIP Tunnel 410 formed between the HA 404 and Wi-Fi AP/FA 408 for Wi-Fi, there is data flow in accordance with the Wi-Fi air interface standard from the Wi-Fi HA 404 to the Wi-Fi FA 408, and to the UE 160. If the UE 160 triggers a handover, the handover process is initiated.

With continued reference to FIG. 6, once the handover is triggered, there is a DHCP request sent from the UE 160 to the LTE FA 406. The LTE FA 406 then contacts the DHCP server 502 within the small cell 100 to obtain a DHCP address. The DHCP acknowledges the LTE FA 406 request. Then the LTE FA 406 sends a MIP Register Request to the Wi-Fi HA 404, and the Wi-Fi HA 404 responds to the LTE FA 406, and creates a MIP Tunnel 410 between the Wi-Fi HA 404 and the LTE FA 406. Then the LTE FA 406 acknowledges the UE's DHCP request, and there is data flow created between the Wi-Fi HA 404 and the UE 160 via the LTE FA 406.

Figure 7A:
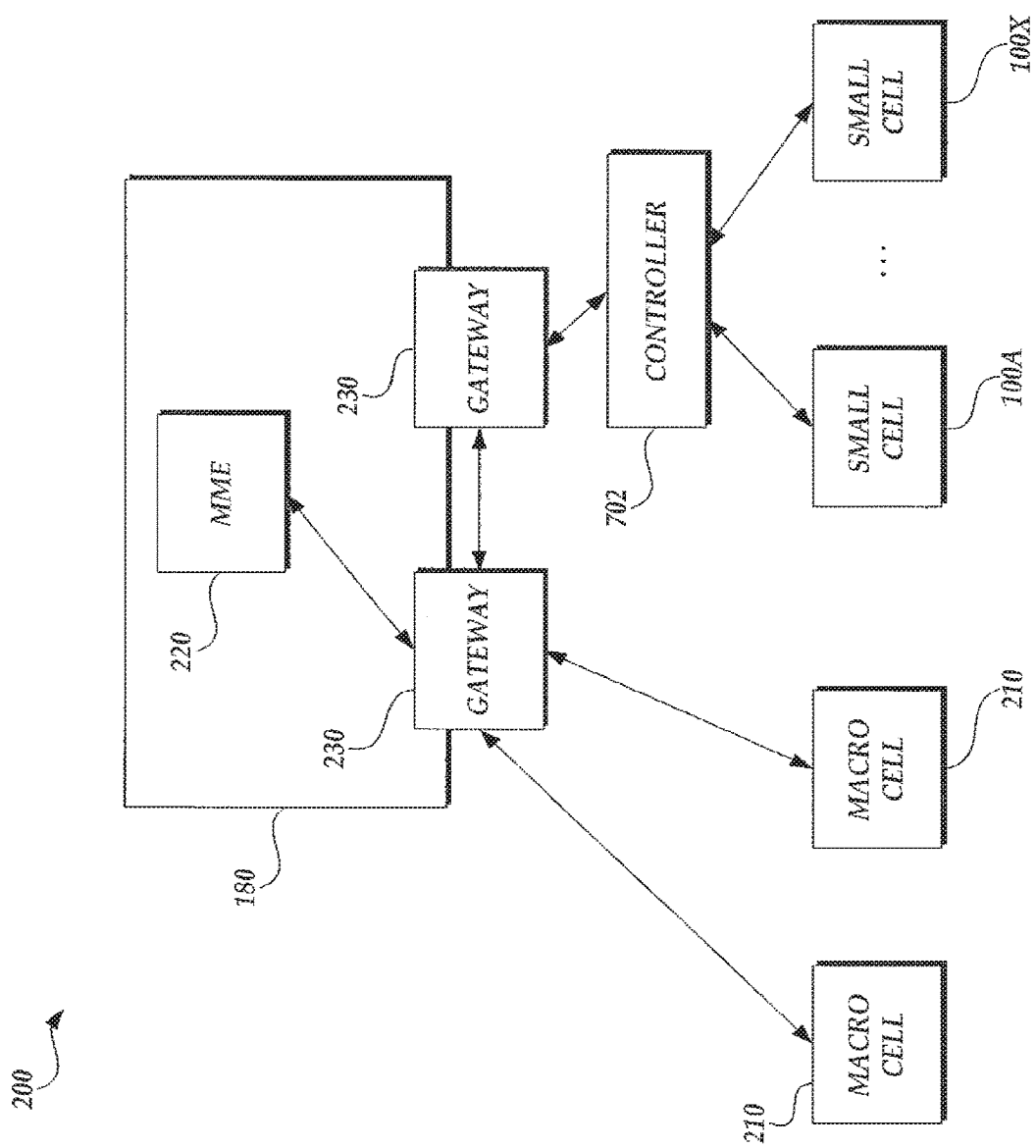

FIG. 7A illustrates an embodiment for managing handovers between a set of small cells 100A-100X in inter-small cell handovers in a heterogeneous environment 200. In some embodiments, it is possible to have the small cells 100 be autonomous and self-sustaining devices, where each small cell runs the necessary management functions independently. In such embodiments, the small cells may be referred to as "standalone" or "autonomous" small cells. In the embodiment of FIG. 7A, the heterogeneous environment 200 can include Wi-Fi/LTE controller 702 is used to run some of the high-level management functions performed on each of the small cells from one centralized point, thereby enabling the small cells 100 to be "thin" devices. The high-level management functions may include controlling the quality of service of data across the different technologies, the triggering of handovers between air interface standards within a small cell 100 (e.g., intra small cell handovers), the triggering of handovers between cells based on various criteria (e.g., inter call handovers), the collection of statistics, the monitoring of signal levels, pre-planning of handovers in some locations, security management, location tracking, and the like.

With reference again to an illustrative example above where a person in a mall is downloading a large data file on their UE 160 over Wi-Fi air interface standard and then walks outside the coffee shop to another part of the mall, the data session may be handed-off from the Wi-Fi radio component 120 on a first small cell 100 to the LTE radio component 110 on the same small cell 100 without using the controller 702. When the person continues walking and arrives to a new small cell zone, then the inter-small cell handover, horizontally (LTE to LTE) would be coordinated by the controller 702. Then, the vertical hand-off to the Wi-Fi hotspot in the new small cell can again be controlled by the small cell itself without the controller.

The controller 702 can also be used to offload traffic from carrier to an enterprise, for example. There may be a controller for a plurality of small cells 100 in a carrier network, and another controller for another plurality of small cells in an enterprise network. When a UE 160 moves from the carrier network (for example from the street) into the enterprise network (for example into a building), the controllers communicate with one another to seamlessly handover the traffic from the carrier to the enterprise network of small cells. Additionally, in some embodiment, the controller 702 can implement the various management functions independent of instructions received from core network components or without the knowledge of core network components. Illustratively, the controller 702 may communicate with the core network 180. Additionally, although not illustrated in FIG. 7A, each small cell 100 may maintain a data communication with the core network 180 through gateway 230. Alternatively, at least some portion of the small cells 100 may communicate with the core network 180 through the controller 702.

With reference to FIG. 7B, in another embodiment, the heterogeneous network 200 can include a set of controllers 702A and 702B for implementing various management functions associated with a set of small cells 100. For example, a set of controllers 702A and 702B may be associated with multiple small cells 100 based on geographic criteria such as associating a single controller 702A and 702B to identifiable regions or locations. In this example, each controller 702A and 702B could operate substantially independent of each other. In another example, a set of controllers 702 A may be configured such that each controller 702 is associated with a particular service provider. In this example, a particular region or geographic location may have multiple controllers 702A and 702B. As illustrated in FIG. 7B, controller 702A may also interface with a macro cell 210, directly or indirectly, to facilitate at least some portion of the management functions. Additionally, controllers 702A and 702B may communicate to distribute management functions, to coordinate specific handovers, or to synchronize management information or other information. Although FIG. 7B illustrates a limited number of controllers 702 and small cells 100, one skilled in the relevant art will appreciate that the number and configuration of the controllers and small cells is not limited to illustrations.

With reference now to FIG. 7C, in yet another embodiment, a heterogeneous environment 200 can include a set of controllers 702 that may be hierarchically arranged such that a portion of the management function is distributed among the hierarchically arranged controllers. In this embodiment, the set of controllers may be associated with various small cells 100 or macro cells 210 in the manner described above with regard to FIG. 7B or with regard to other organizational criteria. As illustrated in FIG. 7C, one or more controllers 102T may be in communication with other controllers 702A-702X. The one or more controllers 102 represent an additional layer of controllers that can coordinate communications between controllers or implement some portion of the management functions for a set of controllers. For example, the controller 702T may function as a master controller for a region, a service provider, enterprise network or the like. In another embodiment, the controller 702T may coordinate handovers between controllers that have different capabilities or functions. As described above, although FIG. 7C illustrates a limited number of controllers 702 and small cells 100, one skilled in the relevant art will appreciate that the number and configuration of the controllers and small cells is not limited to illustrations. Similarly, although only one additional level of controller is illustrated in FIG. 7C, the heterogeneous network 200 can also include any number of additional controller per level and any number of levels in a hierarchy.

Figure 8:
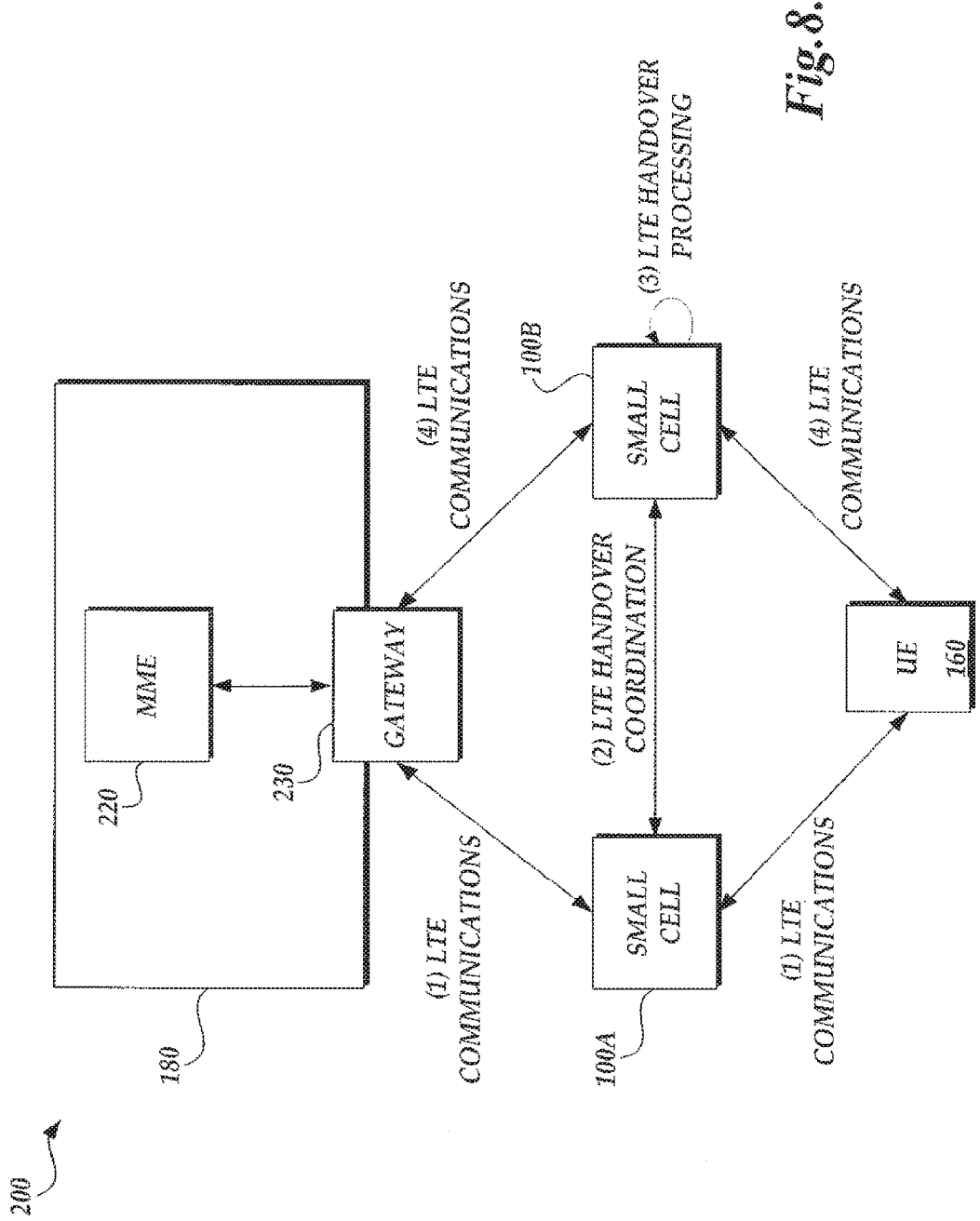
FIG. 8 illustrates another embodiment of a handover between small cells.

FIG. 8 illustrates the coordination of handovers between "standalone" or "autonomous" small cells 100 within a heterogeneous environment 200. In the embodiment illustrated in FIG. 8, a controller, or other control mechanism, is not necessarily used to coordinate handovers between small cells 100. Rather, the small cells 100 communicate with one another to coordinate and execute handovers between them. In some embodiments, it is possible to use the X2 interface, which is an interface allowing the interconnection of small cells 100 or macro cells 210 to each other.

Generally described, some communication interfaces, such as the X2 interface, are generally designed to support signaling information between cells over a wired connection. For example, one or more macro cells 210 can utilize an interface such as the X2 interface to coordinate handovers as facilitated through communications transmitted via the core network 180. In accordance with an embodiment of the present disclosure, however, the small cells 100 may facilitate the transmission of control information for coordination of handovers. Illustratively, the small cells 100 can utilize the Wi-Fi air interface standards to create a dynamic mesh network between two or more small cells 100. Once the mesh network has been established, the small cells 100 can then communicate in accordance with a signaling protocol or other communication protocol to facilitate intra-cell handovers.

By way of illustrative example, as illustrated in FIG. 8, a first small cell 100A is in communication with a UE 160 utilizing a first air interface standard, such as the LTE air interface standard. The first small cell 100A can be configured or otherwise detect the presence of other small cells, such as small cell 100B. For example, a small cell 100 may be able to transmit communications to detect the presence of one or more small cells within a region. In another example, a small cell 100 may be configured with information identifying one or more small cells that may be within communication range of the specific small cell. Based on a detection of another small cell 100 or an identification of another small cell, the two small cells 100A and 100B, can create a mesh network. For example, the small cells 100A and 100B can utilize one of the two radio frequency bands, such as for example the 5 GHz Wi-Fi band. In some embodiments, the mesh network may be generated by the small cells in response to communications with one or more UEs 160. Alternatively, the mesh network may be maintained by the small cells independent of communications with the UEs.

Utilizing the mesh network, the small cells 100A and 100B illustratively coordinate an LTE handover by exchanging information in accordance with signaling protocols, such as the X2 protocol. In this embodiment, however, the coordination of the handover is accomplished via the wireless mesh network and does not utilize the core network for transmission or other coordinate functions. As illustrated in FIG. 8, the receiving small cell 100B can process and achieve a handover based on coordination information exchanged between the two small cells 100. In one aspect, the utilization of a mesh network may have improved speed and performance by facilitating direct communication between the small cells. In another aspect, the small cells do not require additional cabling to facilitate the direct connection between the small cells. In still a further aspect, the composition of the small cells included in the mesh networks can be dynamically adjusted according to the function to be implemented, the particular UE or UEs to be handed over, specific services providers or other criteria. Although the mesh network is illustrated in FIG. 8 as provided in accordance with the Wi-Fi air interface standard, in other embodiments, the mesh network can also be achieved using other air interface standards instead of, or in addition to a Wi-Fi based mesh network.

In any of the vertical handover scenarios described above, as well as in any handover between a small cell and a backhaul network, it is beneficial to ensure a uniform quality of service (QoS) across technologies or networks. In order to achieve a uniform QoS, it is important to translate the different QoS standards over the different technologies and networks in order to unify them FIGS. 9A-9C illustrate an embodiment of translation of quality of service standards within a heterogeneous network 200 (FIG. 2).

Figure 9A:
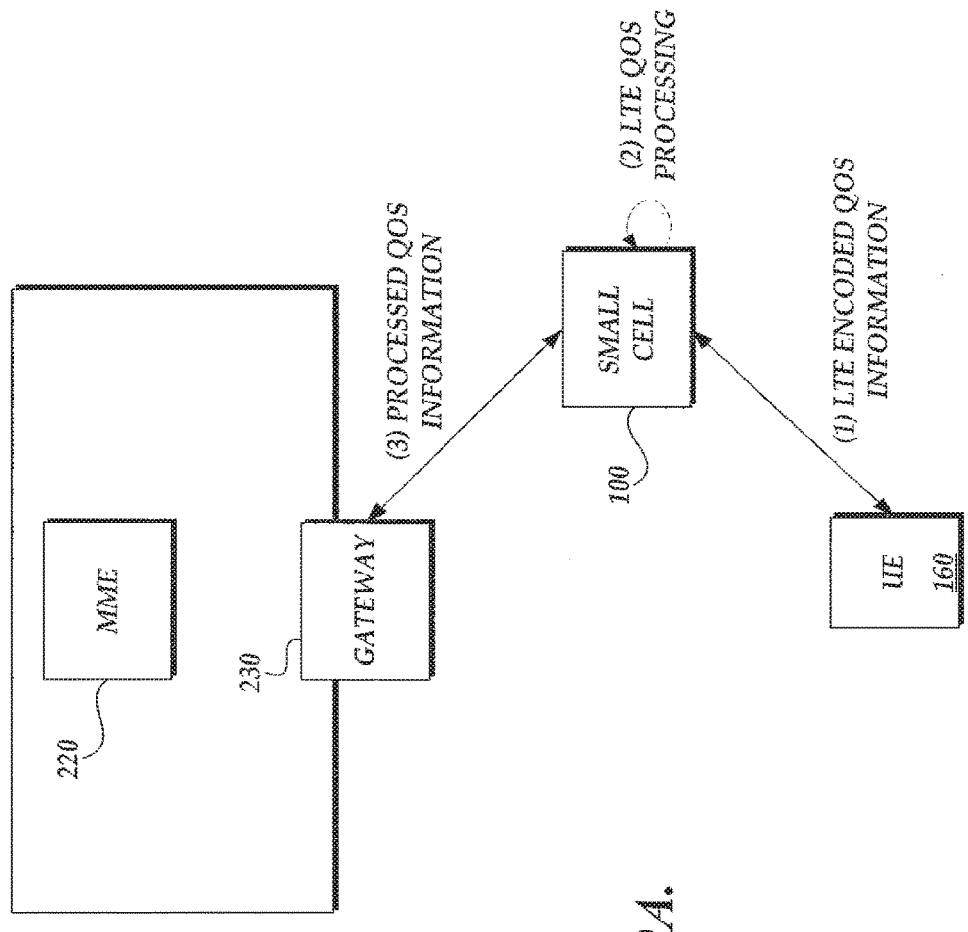
FIGS. 9A-9C illustrate an embodiment of translation of quality of service standards within a heterogeneous network.

With reference to FIG. 9A, in an illustrative embodiment, a small cell 100 has established communications with a UE 160 in accordance with a first air interface standard, such as the LTE air interface standard. Illustratively, the UE 160 and small cell 100 can exchange performance metric information related to the existing communication channel between the UE and the small cell. Examples of the performance metric information can include QoS information, other error information, latency information, and the like. Additionally, the performance metric information can be embodied in a format specified by the currently utilized air interface standard. For example, QoS information can be embodied in the QoS Class Identifier (QCI) standard for communications in accordance with the LTE air interface standard. In another example, QoS information can be embodied in the Wi-Fi Multimedia (WMM) standard for communications in accordance with the Wi-Fi air interface standard. One skilled in the relevant art will appreciate that the above identified examples are illustrative in nature and should not be construed as limiting. 6

With continued reference to FIG. 9A, once the performance metric information, such QoS information, is received at the small cell 100, the small cell processes the performance metric information. In one embodiment, the small cell 100 translates the received performance metric information (e.g., the QoS information) into a format utilized between the small cell 100 and the core network 180. For example, QoS information related to communications between the UE 160 and the small cell 100 that is passed to the core network 180 can be embodied in accordance with the Differentiated Services Code Point (DSCP) standard or the 802.1p standard. Illustratively, the small cell 100 translates the information by mapping the performance metric from one standard/protocol to a second standard/protocol. Additionally, the small cell 100 can include additional routing/communication information utilized to process the translated performance metric information. For example, the small cell 100 can include DSCP tag in the generic routing encapsulation (GRE) header used on the GRE tunnel to send traffic on the core network 180.

Figure 9B:
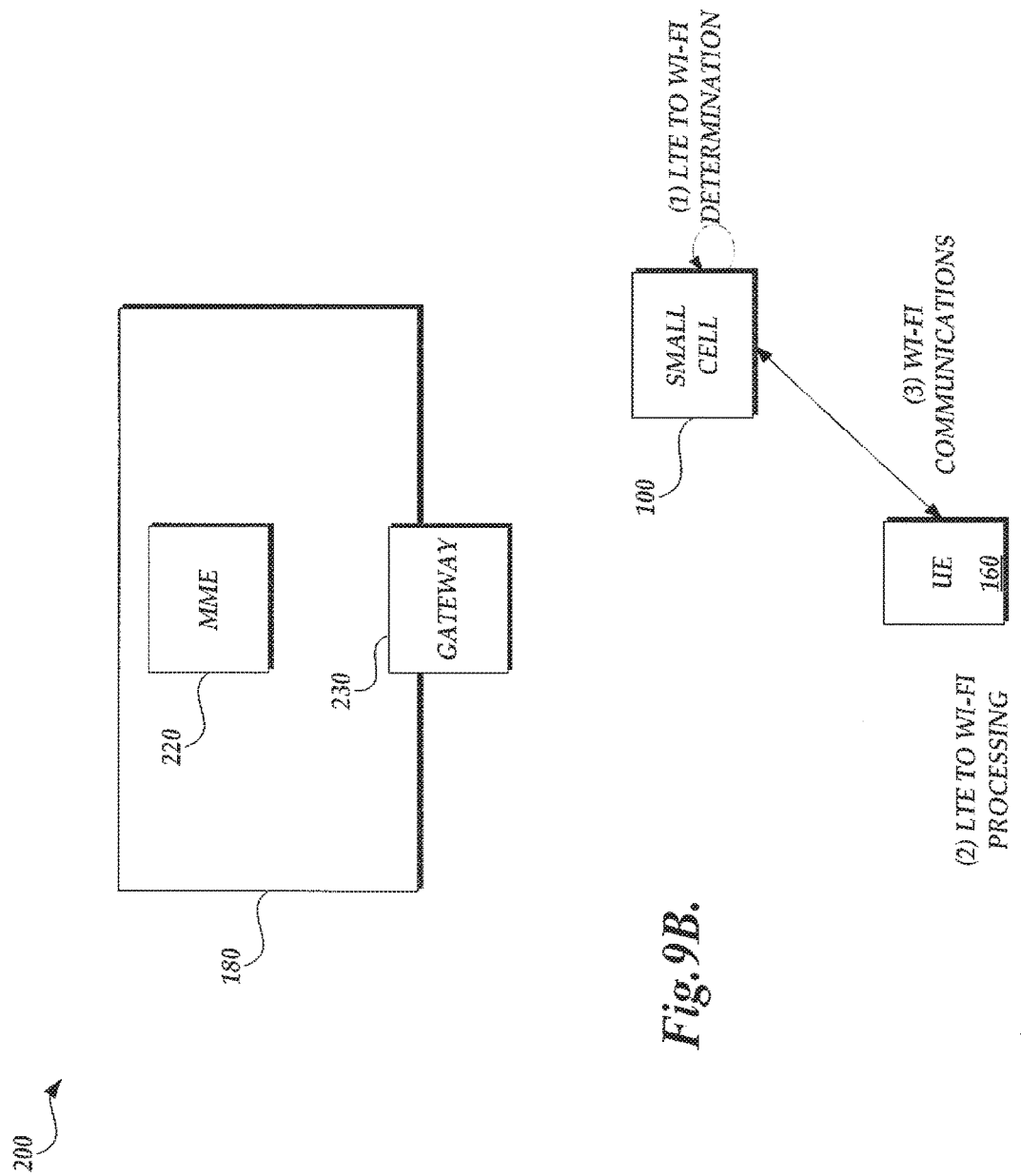
Figure 9C:
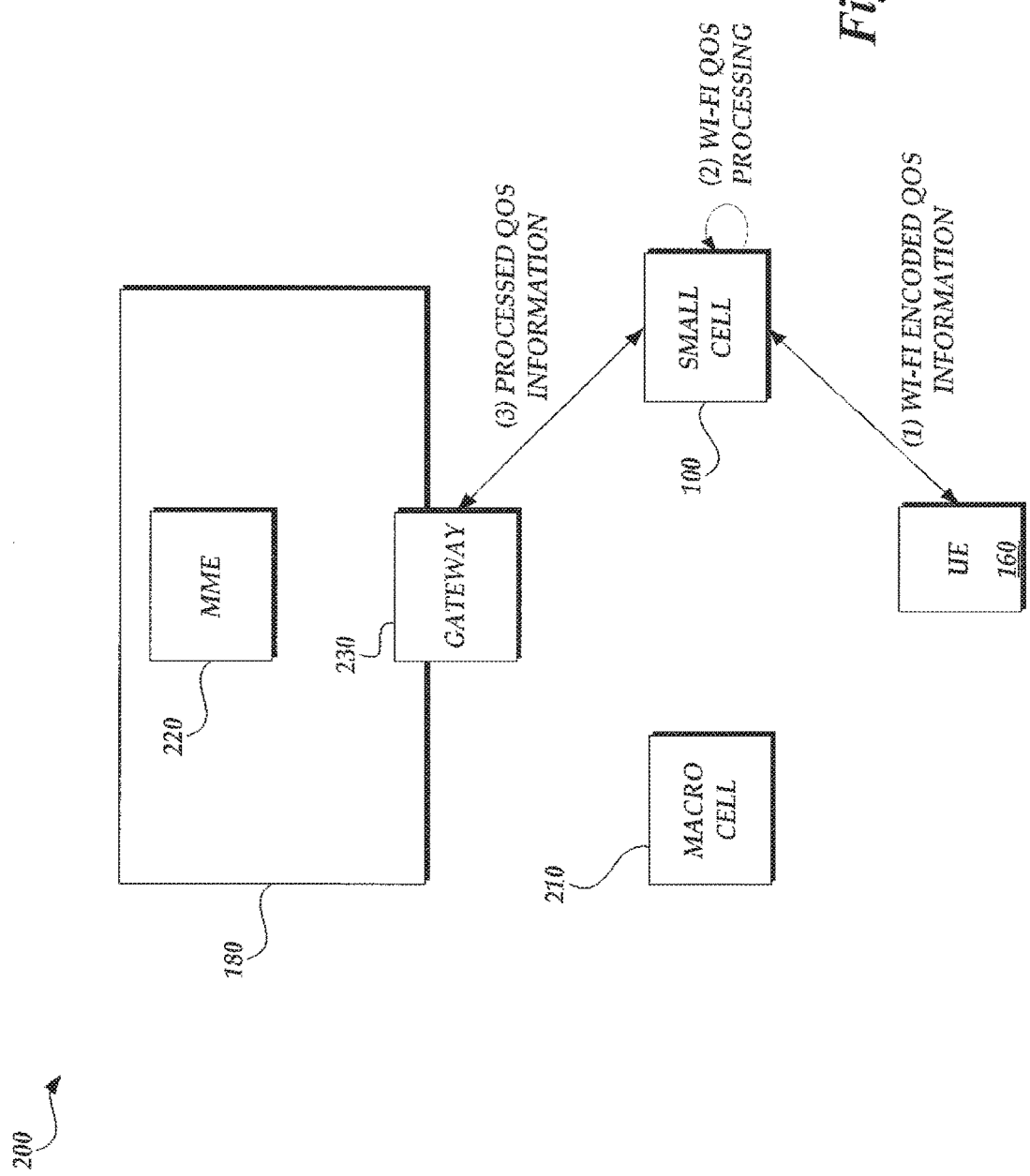

With reference now to FIG. 9B, as previously described, the small cell 100 may implement an intra-small cell handover in which communications between the small cell and one or more UEs utilize a second air interface standard, such as the Wi-Fi air interface standard. Various embodiments related to the execution of an intra-cell handover have been described above. With reference to FIG. 9C, upon a successful intra-small cell handover, the UE 160 and small cell 100 can exchange performance metric information related to the current communication channel between the UE and the small cell (e.g the Wi-Fi communication channel). Illustratively, the performance metric information is embodied in accordance with the current air interface standard associated with the communication channel. Additionally, the performance metric information may be different from the performance metric information previously exchanged between the UE 160 and the small cell 100 in accordance with a previously utilized air interface standard.

Similar to the process illustrated in FIG. 9A, in one embodiment, the small cell 100 translates the received performance metric information (e.g., the QoS information) into a format utilized between the small cell 100 and the core network 180. For example, QoS information related to communications between the UE 160 and the small cell 100 that is passed to the core network 180 can be embodied in accordance with the previously utilized DSCP standard or the 802.1p standard. The small cell 100 can also provide additional routing information as described above.

From the perspective of the components of the core network 180, the performance metric information exchanged between the small cell 100 and the core network 180 is independent of the current air interface standard utilized between the UE 160 and the small cell 100. As previously described, in some embodiments, the components of the core network 180 may not be provided any knowledge of the current air interface standard being utilized. Accordingly, the components of the core network 180 would process received performance metric information independent of any knowledge of a current air interface standard. Likewise, the UE 160 would only receive performance metric information or instructions from the small cell 100 based on the current air interface standard being utilized between the UE and the small cell. The performance metric information or commands received by the UE 160 would also be independent of a format utilized between the small cell 100 and the components of the core network 180.

Another advantage of the small cell 100 which supports several technologies including LTE and Wi-Fi is that it can improve UE location resolution. Generally, received signal strength indicator (RSSI)-based location tracking uses trilateration to locate UEs such as mobile devices. In trilateration, at least three adjacent access points are needed to resolve any ambiguities. In Wi-Fi networks, neighboring or adjacent access points are assigned different frequency channels to mitigate interference between cells. Therefore, to measure the received power and/or the RSSI of access points near a mobile device, it is necessary to tune to the channels of neighboring access points. This tuning might affect QoS for real-time services (including voice and video) which are sensitive to time delays because the mobile device needs to switch between channels going from data communications to RTLS and back to data communications.

FIG. 10 illustrates an embodiment for facilitating location based services utilizing small cells 100 in a heterogeneous environment 200. As previously described, in one embodiment the small cells 100A, 100B and 100C include multiple air interfaces for communicating with UEs 160. As illustrated in FIG. 10, the UE 160 has a communication channel with a small cell 100 in accordance with a first air interface, such as the LTE air interface standard. Without implementing a handover, the UE 160 can also instantiate a second communication channel with the small cell 100C for purposes of exchange location information. The second communication channel may be maintained continuously or established in a periodic or as needed basis. Illustratively, the UE 160 can obtain location information from the small cell 100C, such as global positioning system ("GPS") information, geographic coordinates, or other information utilized to determine an absolute or relative location or position information.

With continued reference to FIG. 10, in accordance with one embodiment, the UE 160 utilizes location information from a three or more small cells 100 (or other cells) to determine an absolute or relative location or position. In the illustrated embodiment, the UE 160 can establish communications with two other small cells 100A and 100B via the Wi-Fi air interface standard to obtain additional location information. Based on the location information obtained from multiple small cells 100A, 100B, and 100C, the UE 160 can determine absolute or relative location or position utilizing a variety of known techniques. Additionally, because the UE 160 has utilized an air interface standard not being utilized for purposes of communications (e.g., the Wi-Fi air interface standard), the UE 160 can obtain the location information from the small cells 100A, 100B and 100C without disrupting the communication channel between the UE 160 and the small cell 100C. Additionally, better location resolution is possible since there are a total of six RSSI measurements (three on each frequency band, for example LTE on the 2.1 GHz band and Wi-Fi on the 2.4 GHz band).

Although FIG. 10 illustrates the utilization of the Wi-Fi air interface standard for purposes of obtaining location information, the UE 160 and small cells 100 can use the LTE interface for determining location of the mobile device.

Additionally, in this embodiment, the UE 160 can obtain location information from other cells, such as a macro cell 210, that may only support a single air interface standard or that does not necessarily support a shorter range air interface standard, such as the Wi-Fi air interface standard. Still further, in one embodiment, the UE 160 may determine location based on location information obtained from the small cells 100. Alternatively, the UE 160 may transmit location information, or partially processed location information, to one or more components for determination of location. For example, the UE 160 may utilize web services that facilitate the determination of location based on location information provided by the UE.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A small-cell gateway for multi-access network communication, the small-cell gateway comprising:
    first radio transceiver circuitry to communicate with at least one mobile device according to a cellular air interface standard including providing at least one small cell according to the cellular air interface standard;
    second radio transceiver circuitry to communicate with mobile devices according to a wireless local area network (WLAN) air interface standard; and
    control circuitry to communicate coordination information to coordinate handoffs of mobile devices between the cellular and WLAN air interface standards and to coordinate handoffs among small cells of the cellular air interface standard.

2. The small-cell gateway of claim 1 wherein the control circuitry is configured to perform intra-cell handovers among the cells of the network formed according to the WLAN air interface standard based on control information passed along the communication network formed according to the WLAN air interface standard.

3. A small-cell gateway for multi-access network communication, the small-cell gateway comprising:
    first radio transceiver circuitry to communicate with at least one mobile device according to a cellular air interface standard including providing at least one small cell according to the cellular air interface standard;
    second radio transceiver circuitry to communicate with mobile devices according to a wireless local area network (WLAN) air interface standard; and
    control circuitry to coordinate communications including handoff of communications between the cellular and WLAN air interface standards.

4. The small-cell gateway of claim 3 wherein a network is formed according to the WLAN air interface standard comprising a plurality of cells, and wherein the control circuitry is configured to perform intra-cell handovers among the cells of the network formed according to the WLAN air interface standard based on control information passed along the communication network formed according to the WLAN air interface standard.

5. The small-cell gateway of claim 4 wherein the network formed according to the WLAN air interface standard is a mesh network.

6. The small-cell gateway of claim 5 wherein the network formed according to the WLAN air interface standard is provided within a coverage area of the small cell according to the cellular air interface standard to provide multiple air-interfaces with the small cell.

7. The small-cell gateway of claim 6 further comprising a backhaul interface; and wherein the control circuitry is configured to offload data communications to the backhaul interface.

8. The small-cell gateway of claim 7 further configured to handover communications from a macro-cell of a cellular network to the small cell and offload the communications through the backhaul interface.

9. The small-cell gateway of claim 8, wherein the cellular air interface standard is an LTE cellular air interface standard and the WLAN air interface standard is an IEEE 802.11 air interface standard.

10. The small-cell gateway of claim 9, wherein the cellular air interface standard utilizes a licensed frequency spectrum and the WLAN air interface standard utilizes an unlicensed frequency spectrum.

11. The small-cell gateway of claim 9, wherein the cellular air interface standard and the WLAN air interface standard share unlicensed frequency spectrum.

12. The small-cell gateway of claim 3 wherein the control circuitry is configured to receive coordination information to coordinate communications between the cellular and WLAN air interface standards.

13. The small-cell gateway of claim 12 wherein the coordination information is based on authentication, security, provisioning or subscriber mobility information.

14. The small-cell gateway of claim 12 wherein the coordination information includes statistics to coordinate communications between the cellular and WLAN air interface standards.

15. The small-cell gateway of claim 3 wherein the small-cell gateway is part of a first base station, and wherein the control circuitry is configured to generate and transmit coordination information to a second base station.

16. The small-cell gateway of claim 3, wherein the small-cell gateway is part of a first small cell, and wherein the control circuitry is configured to generate and transmit coordination information to a second small cell.

17. The small-cell gateway of claim 3, wherein the small-cell gateway is part of a base station, an access point or a combination thereof.

18. The small-cell gateway of claim 3 wherein the control circuitry comprises offload control circuitry configured to offload traffic.

19. The small-cell gateway of claim 3 wherein the control circuitry is configured to increase traffic density by coordination of communications between the cellular and WLAN air interface standards.

20. The small-cell gateway of claim 3 wherein the control circuitry is configured by control software to coordinate communications between the cellular and WLAN air interface standards.

21. The small-cell gateway of claim 3 wherein the control circuitry is configured to use authentication, security, provisioning or subscriber mobility information to coordinate communications between the cellular and WLAN air interface standards.

22. The small-cell gateway of claim 3 wherein the control circuitry is configured to generate statistics to coordinate communications between the cellular and WLAN air interface standards.

23. The small-cell gateway of claim 3 further comprising location determination circuitry.

24. The small-cell gateway of claim 3 wherein the small-cell gateway is part of a first base station, and wherein the control circuitry is configured to generate and transmit coordination information to a second base station.

* * * * *